United States Patent
Motoyama et al.

(10) Patent No.: US 11,543,532 B2
(45) Date of Patent: Jan. 3, 2023

(54) SIGNAL PROCESSING APPARATUS, SIGNAL PROCESSING METHOD, PROGRAM, AND MOBILE OBJECT FOR MAP GENERATION BADED ON LIDAR AND IMAGE PROCESSING

(71) Applicant: Sony Corporation, Tokyo (JP)

(72) Inventors: Takuto Motoyama, Tokyo (JP); Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 416 days.

(21) Appl. No.: 16/633,593

(22) PCT Filed: Jul. 30, 2018

(86) PCT No.: PCT/JP2018/028415
§ 371 (c)(1),
(2) Date: Jan. 24, 2020

(87) PCT Pub. No.: WO2019/026832
PCT Pub. Date: Feb. 7, 2019

(65) Prior Publication Data
US 2020/0209401 A1    Jul. 2, 2020

(30) Foreign Application Priority Data
Aug. 2, 2017  (JP) .............................. JP2017-149686

(51) Int. Cl.
*G01S 17/89* (2020.01)
*G06T 7/50* (2017.01)
(Continued)

(52) U.S. Cl.
CPC ............ *G01S 17/89* (2013.01); *G01S 17/931* (2020.01); *G06T 7/50* (2017.01); *G08G 1/0141* (2013.01); *G06T 2207/10028* (2013.01)

(58) Field of Classification Search
None
See application file for complete search history.

(56) References Cited

U.S. PATENT DOCUMENTS

2012/0134597 A1*  5/2012  Finch ..................... G06T 17/00
                                                               382/201
2017/0178352 A1*  6/2017  Harmsen ................ G06V 10/42
(Continued)

FOREIGN PATENT DOCUMENTS

JP        2007-255979 A     10/2007
JP        2008304268 A      12/2008
(Continued)

OTHER PUBLICATIONS

International Search Report and Written Opinion dated Oct. 19, 2018 for PCT/JP2018/028415 filed on Jul. 30, 2018, 12 pages.
(Continued)

*Primary Examiner* — Edemio Navas, Jr.
(74) *Attorney, Agent, or Firm* — Xsensus LLP

(57) ABSTRACT

According to some embodiments, there is provided a method comprising labeling each of a plurality of subjects in an image with a label, the label for each subject indicating a kind of the subject, wherein the labeling comprises analyzing the image and/or distance measurement points for an area depicted in the image, and determining additional distance information not included in the distance measurement points, wherein determining the additional distance information comprises interpolating and/or generating a distance to a point based at least in part on at least some of the distance measurement points, wherein the at least some
(Continued)

of the distance measurement points are selected based at least in part on labels assigned to one or more of the plurality of subjects.

8 Claims, 20 Drawing Sheets

(51) Int. Cl.
*G01S 17/931* (2020.01)
*G08G 1/01* (2006.01)

(56) References Cited

U.S. PATENT DOCUMENTS

| 2017/0296010 | A1* | 10/2017 | Li | A47L 9/149 |
| 2018/0289228 | A1* | 10/2018 | Xue | G05D 1/02 |
| 2018/0307930 | A1* | 10/2018 | Mittal | G06V 20/588 |

FOREIGN PATENT DOCUMENTS

| JP | 2016134090 A | 7/2016 |
| JP | 2016176736 A * | 10/2016 |
| WO | WO-2015097824 A1 | 7/2015 |

OTHER PUBLICATIONS

Atapour-Abarghouei, A., and Breckon., T.P., "DepthComp: Real-time Depth Image Completion Based on Prior Semantic Scene Segmentation," 28th British Machine Vision Conference (BMVC), Jul. 21, 2017, 13 pages.

Huang, W., et al., "Joint Object Segmentation and Depth Upsampling," IEEE Signal Processing Letters, vol. 22, No. 2, IEEE, Feb. 2015, pp. 192-196.

Liu, M., et al., "Semantic-Aware Depth Super-Resolution in Outdoor Scenes," arXiv.org, May 31, 2016 Cornell University Library, 201 Olin Library Cornell University Ithaca, NY 14853, May 31, 2016, 15 pages.

Lu, J., and Forsyth, D., "Sparse depth super resolution," IEEE Conference on Computer Vision and Pattern Recognition (CVPR), IEEE, Jun. 7, 2015, pp. 2245-2253.

Schneide, N., et al., "Semantically Guided Depth Upsampling," German Conference on Pattern Recognition, Springer International Publishing, Aug. 27, 2016, 12 pages.

Zheng, S., et al., "Depth Map Upsampling Using Segmentation and Edge Information," International Conference on Image and Graphics, Springer International Publishing, Aug. 4, 2015, pp. 116-126.

* cited by examiner

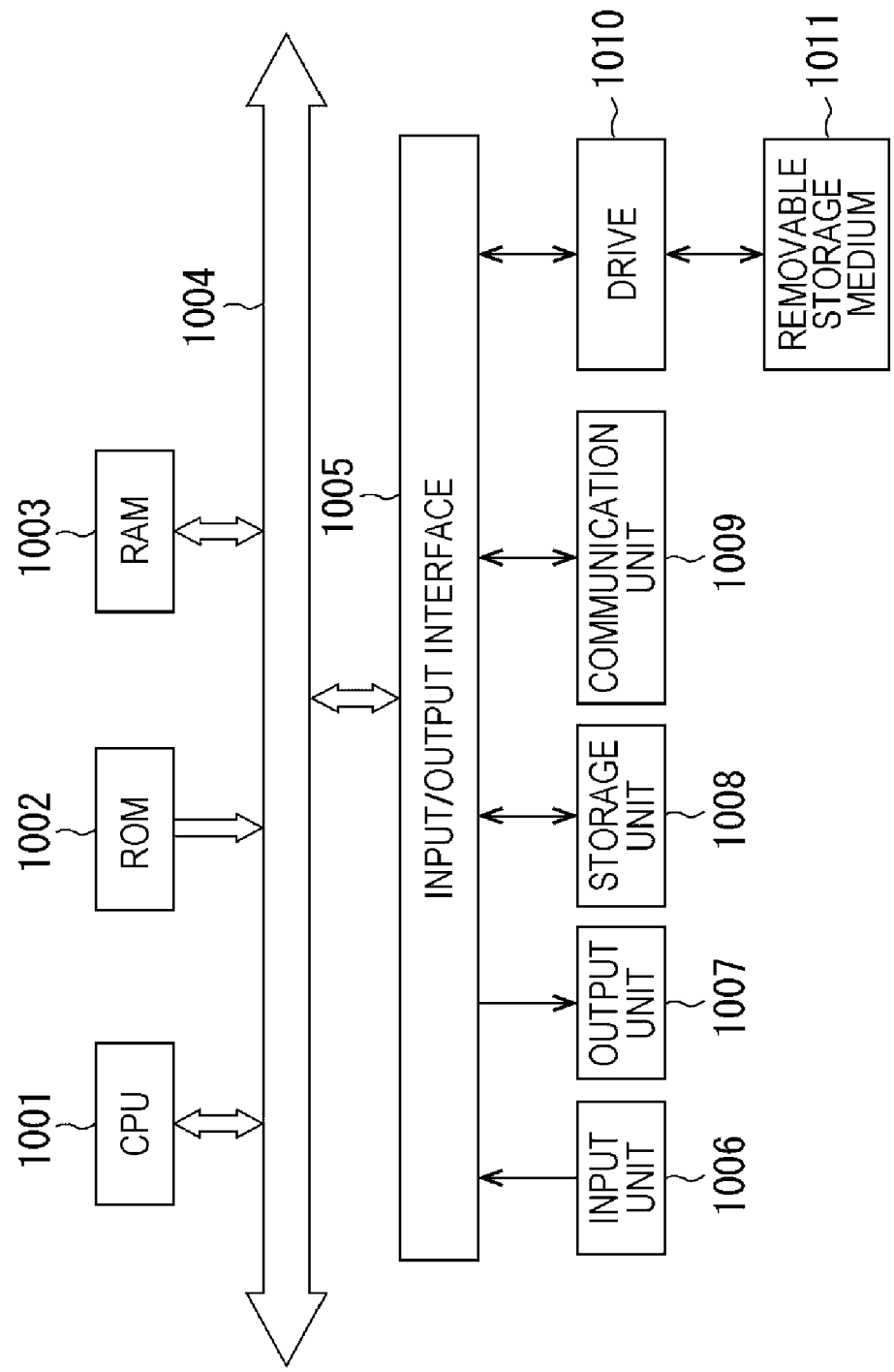

SIGNAL PROCESSING APPARATUS, SIGNAL PROCESSING METHOD, PROGRAM, AND MOBILE OBJECT FOR MAP GENERATION BADED ON LIDAR AND IMAGE PROCESSING

CROSS-REFERENCE TO RELATED APPLICATIONS

The present application is based on PCT filing PCT/JP2018/028415, filed Jul. 30, 2018, which claims priority to JP 2017-149686, filed Aug. 2, 2017, the entire contents of each are incorporated herein by reference.

TECHNICAL FIELD

The present disclosure relates to a signal processing apparatus, a signal processing method, a program, and a mobile object, and particularly to a signal processing apparatus enabling an environment map around a mobile object to be generated with high accuracy, a signal processing method, a program, and a mobile object.

BACKGROUND ART

There has been developed, in order to realize autonomous movement of a mobile object, a technology for generating a local map around the mobile object and estimating a self-position thereof.

For such a technology, there has been proposed a technology for weighting a result obtained by use of a monocular camera (image) and a radar (radio wave) depending on a situation and detecting an object, thereby generating a local map (see Patent Literature 1).

CITATION LIST

Patent Literature

PTL 1: JP 2007-255979A

SUMMARY OF INVENTION

Technical Problem

However, distance estimation based on an image shot by a monocular camera is generally less accurate, and a radar has a low accuracy of determining the kind of an object, and thus a high-definition map may not be generated only by weighting both of them.

The present disclosure has been made in terms of such a situation, and is particularly directed to enable an environment map around a mobile object to be generated with high accuracy.

Solution to Problem

According to some embodiments, there is provided a method comprising labeling each of a plurality of subjects in an image with a label, the label for each subject indicating a kind of the subject, wherein the labeling comprises analyzing the image and/or distance measurement points for an area depicted in the image, and determining additional distance information not included in the distance measurement points, wherein determining the additional distance information comprises interpolating and/or generating a distance to a point based at least in part on at least some of the distance measurement points, wherein the at least some of the distance measurement points are selected based at least in part on labels assigned to one or more of the plurality of subjects.

According to some other embodiments, there is provided an apparatus comprising at least one processor and at least one storage medium having encoded thereon executable instructions that, when executed by at least one processor, cause the at least one processor to carry out a method comprising labeling each of a plurality of subjects in an image with a label, the label for each subject indicating a kind of the subject, wherein the labeling comprises analyzing the image and/or distance measurement points for an area depicted in the image and determining additional distance information not included in the distance measurement points, wherein determining the additional distance information comprises calculating a distance to a point based at least in part on at least some of the distance measurement points and on labels assigned to one or more of the plurality of subjects.

According to some other embodiments, there is provided at least one non-transitory storage medium having encoded thereon executable instructions that, when executed by at least one processor, cause the at least one processor to carry out a method comprising labeling each of a plurality of subjects in an image with a label, the label for each subject indicating a kind of the subject, wherein the labeling comprises analyzing the image and/or distance measurement points for an area depicted in the image and determining additional distance information not included in the distance measurement points, wherein determining the additional distance information comprises calculating a distance to a point based at least in part on at least some of the distance measurement points, wherein the at least some of the distance measurement points are selected based at least in part on labels assigned to one or more of the plurality of subjects.

Advantageous Effects of Invention

According to one aspect of the present disclosure, it is particularly possible to generate an environment map around a mobile object with high accuracy.

BRIEF DESCRIPTION OF DRAWINGS

FIG. 20 is a diagram for explaining an exemplary configuration of a general-purpose computer.

DESCRIPTION OF EMBODIMENTS

Figure 1:
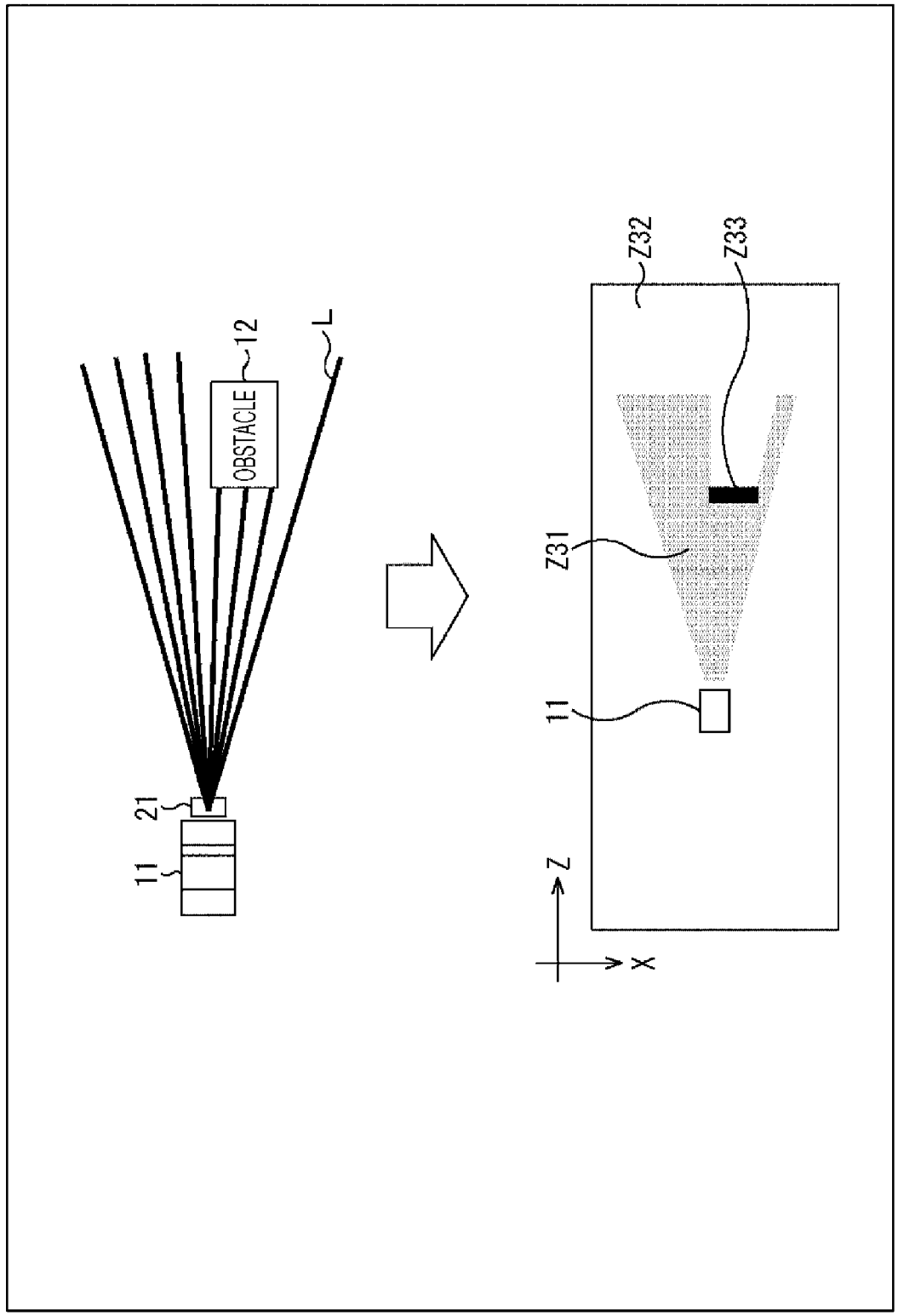
FIG. 1 is a diagram for explaining a method for detecting an obstacle by use of LiDAR.

A preferred embodiment according to the present disclosure will be described below in detail with reference to the accompanying drawings. Additionally, the components having substantially the same functional configurations are denoted with the same reference numerals in the present specification and the drawings, and thus the repeated description thereof will be omitted.

A mode for carrying out the present technology will be described below. The description will be made in the following order.

1. Preferred embodiment of present disclosure
2. Example performed in software

1. Preferred Embodiment of Present Disclosure

Local Map Generated by LiDAR

A principle of detecting an obstacle 12 by a mobile object 11 including a light detection and ranging or laser imaging detection and ranging (LiDAR) 21 will be first described with reference to FIG. 1. Here, the upper part of FIG. 1 is a diagram of the mobile object 11 viewed from above, and the lower part of FIG. 1 corresponding to the upper part of FIG. 1 illustrates an exemplary occupancy grid map as a local map around the mobile object 11.

Further, FIG. 1 illustrates that the mobile object 11 moves in a traveling direction which is rightward in the figure, for example, and the obstacle 12 is present ahead of the mobile object 11 in its moving direction and slightly on the right.

The LiDAR 21 projects a laser light in a respective radial light projection direction L as illustrated in the upper part of FIG. 1 ahead in the moving direction while horizontally rotating a light projection unit arranged at a plurality of angles in the vertical direction, and receives a light reflected on the obstacle 12 thereby to find a distance on the basis of a round-trip time as a difference between the light projection time and the reflected light reception time and to measure a distance and a direction to the obstacle 12.

An occupancy grid map as a local map as illustrated in the lower part of FIG. 1 is found on the basis of the measurement results by the LiDAR 21.

The occupancy grid map is generated by dividing a space around the mobile object 11 into a plurality of cells in a grid pattern and classifying each cell into any of with obstacle, free space without obstacle, and unknown region on the basis of the ray tracing principle for the measurement results by the LiDAR 21.

In the occupancy grid map in the lower part of FIG. 1, a range without a distance measurement result by the LiDAR 21 (a range outside the light projection direction) is indicated in white, and a region Z32 indicating unknown is set.

Further, a gray region Z31 indicating a free space (a range in which an obstacle is less likely to be present) is set by the LiDAR 21 in a range in which reception of a reflected light from the obstacle 12 is not confirmed (a range in the light projection direction but without reception of a reflected light).

Further, a black region Z33 indicating that the obstacle 12 is highly likely to be present is set by the LiDAR 21 in a range in which a reflected light is received and a distance is measured.

Cases with Erroneous Detection

However, in a case where the LiDAR 21 is used, a laser light is discretely projected in a 2D space in the horizontal direction and the vertical direction which are orthogonal to the light projection direction, and thus if a small obstacle is present between adjacent light projection directions, the obstacle may not be detected.

Figure 2:
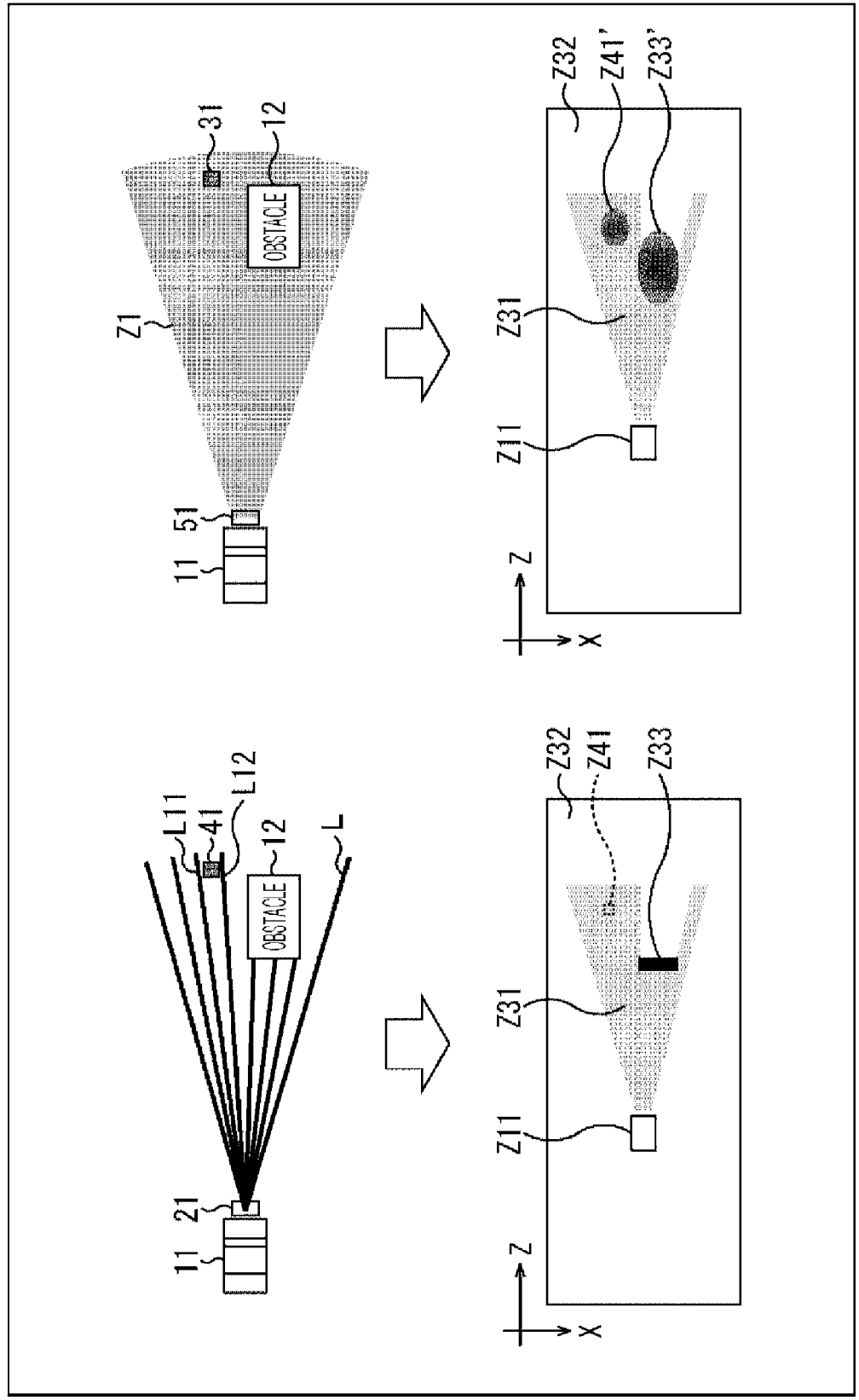
FIG. 2 is a diagram for explaining a difference in characteristics between LiDAR and a camera.

That is, in a case where a small obstacle 41 is present between the light projection directions L11 and L12 as illustrated in the upper left of FIG. 2, a reflected light may not be received, and thus the small obstacle may not be reflected on the occupancy grid map as a local map as illustrated in the lower left of FIG. 2. A projected laser light is not reflected on the obstacle 41, and the fact is indicated in a dotted line in the occupancy grid map in the lower left of FIG. 2.

To the contrary, it is assumed that a monocular camera 51 is provided on the mobile object 11 instead of the LiDAR 21 as illustrated in the upper right of FIG. 2 and a distance and a direction of an obstacle are detected on the basis of an image shot by the camera 51. The camera 51 can continuously detect the presence and distance of an object, even the small obstacle 41 at pixel level in a 2D space orthogonal to the shooting direction, thereby almost accurately capturing the obstacle 41.

However, when the occupancy grid map as a local map is to be generated on the basis of an image shot by the camera 51, an accuracy of measuring the distances to the obstacles 12 and 41 is lower than that with the LiDAR 21. Thus, in a case where the occupancy grid map is generated, the probability that an object is present near the obstacles 12 and 41 is diffused and set as indicated by regions Z33' and Z41' in the lower right of FIG. 2, for example, and thus the presence of the obstacles 12 and 41 can be confirmed but both the directions and the distances thereof are ambiguous.

Characteristics and Differences Between LiDAR and Camera

Figure 3:
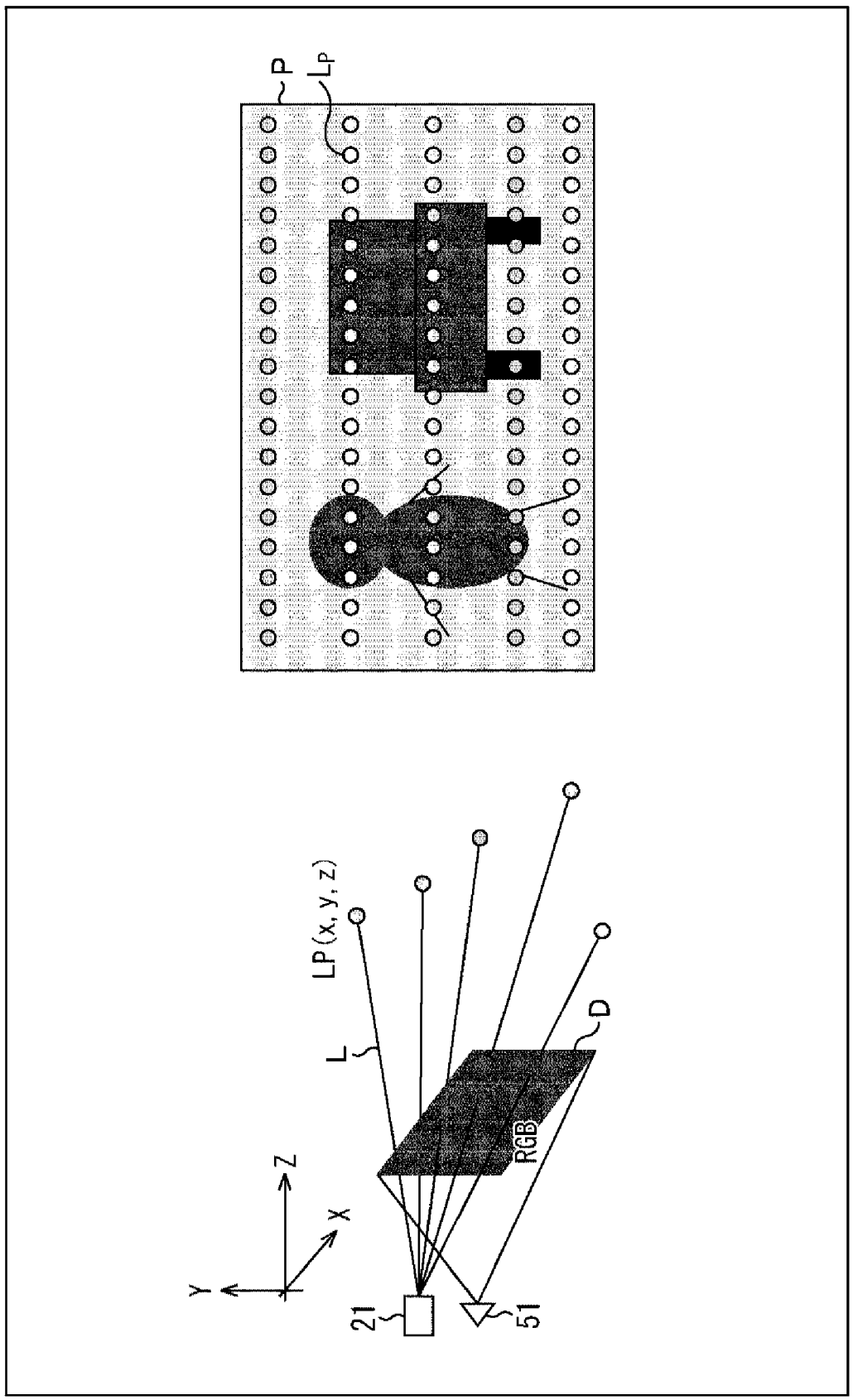
FIG. 3 is a diagram for explaining superimposition of a group of LiDAR points on an image.

That is, the LiDAR 21 is in a discrete range as indicated in the light projection directions L1 to Ln relative to a 2D space orthogonal to a monitoring direction as illustrated on the left of FIG. 3, and thus a distance can be measured at low spatial resolution but with high accuracy. To the contrary, the camera 51 is in a substantially continuous range at pixel level relative to a 2D space orthogonal to a monitoring direction as indicated by a shooting plane D, and thus spatial resolution is high but distance measurement accuracy is low.

Further, the camera 51 can capture objects in a substantially-continuous range relative to the entire shooting plane D as illustrated on the right of FIG. 3, and thus object recognition accuracy is high. To the contrary, the LiDAR 21 can detect obstacles just discretely relative to the shooting plane D as indicated in dots, and thus object recognition accuracy of the obstacles is low.

According to the present disclosure, the LiDAR 21 and the camera 51 are combined to make use of the respective characteristics thereof, thereby enhancing spatial resolution, object recognition accuracy, and distance accuracy and generating a high-definition local map.

Figure 4:
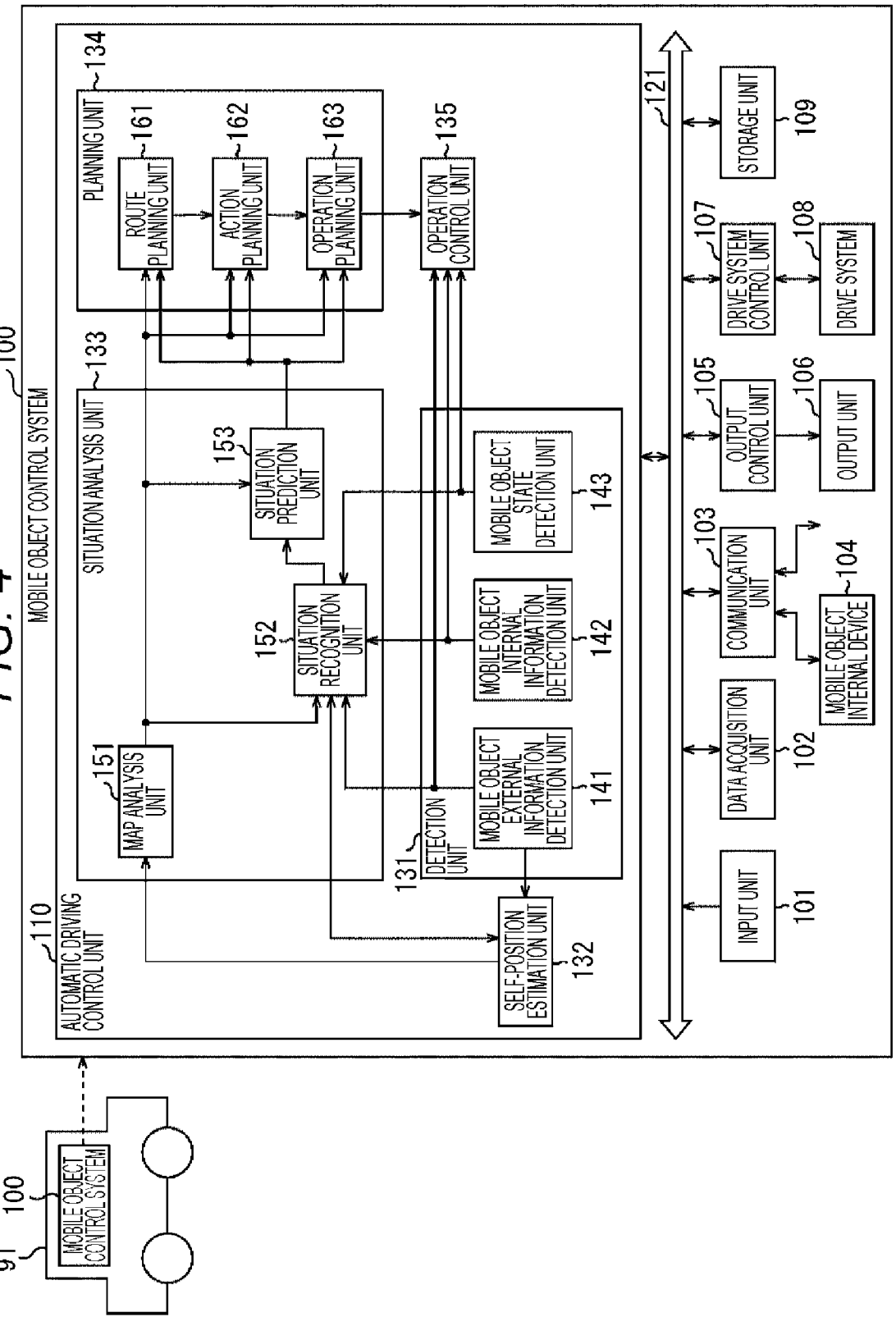
FIG. 4 is a block diagram illustrating an exemplary configuration of a preferred embodiment of a mobile object control system according to the present disclosure.

Exemplary Configuration of Mobile Object Control System for Controlling Mobile Object According to an Embodiment of Present Disclosure FIG. 4 is a block diagram illustrating an exemplary configuration of the schematic functions of a mobile object control system 100 for controlling a mobile object 91 according to an embodiment of the present disclosure. Additionally, the mobile object control system 100 in FIG. 4 is an exemplary control system applicable to various mobile objects to which the present technology is applicable, and can be applied as a system for controlling a vehicle, an airplane, a ship, a drone, a robot, and the like, for example.

The mobile object control system 100 includes an input unit 101, a data acquisition unit 102, a communication unit 103, a mobile object internal device 104, an output control unit 105, an output unit 106, a drive system control unit 107, a drive system 108, a storage unit 109, and an automatic driving control unit 110. The input unit 101, the data acquisition unit 102, the communication unit 103, the output control unit 105, the drive system control unit 107, the storage unit 109, and the automatic driving control unit 110 are mutually connected via a communication network 121. The communication network 121 is configured of a communication network, a bus, or the like conforming to any standard such as controller area network (CAN), local interconnect network (LIN), local area network (LAN), FlexRay (registered trademark), or the like. Additionally, the respective units in the mobile object control system 100 may be directly connected not via the communication network 121.

Additionally, in a case where each unit in the mobile object control system 100 makes communication via the communication network 121, the description of the communication network 121 will be omitted below. For example, in a case where the input unit 101 and the automatic driving control unit 110 make communication via the communication network 121, the case will be simply described as the input unit 101 and the automatic driving control unit 110 make communication.

The input unit 101 includes a device used by a passenger for inputting various items of data, instructions, and the like. For example, the input unit 101 includes an operation device or the like capable of inputting in a way other than manual operation via an operation device such as touch panel, button, microphone, switch, or lever, audio, gesture, and the like. Further, for example, the input unit 101 may be a remote-controlled device using infrared ray or other radio wave, or an externally-connected device such as mobile device or wearable device for the operations of the mobile object control system 100. The input unit 101 generates an input signal on the basis of passenger-input data, instruction, or the like, and supplies it to each unit in the mobile object control system 100.

The data acquisition unit 102 includes various sensors and the like configured to acquire data used for the processing of the mobile object control system 100, and supplies the acquired data to each unit in the mobile object control system 100.

For example, the data acquisition unit 102 includes various sensors configured to detect a state and the like of the mobile object. Specifically, for example, the data acquisition unit 102 includes a gyro sensor, an acceleration sensor, an inertia measurement unit (IMU), a sensor configured to detect the operation amount of the accelerator pedal, the operation amount of the brake pedal, a steering angle of the steering wheel, engine revolutions, the number of motor rotations, or a rotation speed of wheels, and the like.

Further, for example, the data acquisition unit 102 includes various sensors configured to detect external information of the mobile object. Specifically, for example, the data acquisition unit 102 includes a shooting device such as time of flight (ToF) camera, stereo camera, monocular camera, infrared camera, and other camera. Further, for example, the data acquisition unit 102 includes an environment sensor configured to detect weather, meteorological phenomenon, or the like, and a surrounding information detection sensor configured to detect an object around the mobile object. The environment sensor is configured of a raindrop sensor, a fog sensor, a sunlight sensor, a snow sensor, or the like, for example. The surrounding information detection sensor is configured of an ultrasonic sensor, a radar, a light detection and ranging or laser imaging detection and ranging (LiDAR), a sonar, or the like, for example. Additionally, in the mobile object control system 100 according to an embodiment of the present disclosure, the data acquisition unit 102 includes a camera 302 (FIG. 5) described below as a shooting device, and includes a LiDAR 301 (FIG. 5) as a surrounding information detection sensor.

Further, for example, the data acquisition unit 102 includes various sensors configured to detect a current position of the mobile object. Specifically, for example, the data acquisition unit 102 includes a GNSS receiver or the like configured to receive a GNSS signal from a global navigation satellite system (GNSS).

Further, for example, the data acquisition unit 102 includes various sensors configured to detect internal information of the mobile object. Specifically, for example, the data acquisition unit 102 includes a shooting device configured to shoot the driver, a biological sensor configured to detect biological information of the driver, a microphone configured to collect voices inside the mobile object, and the like. The biological sensor is provided on, for example, a seat, the steering wheel, or the like, and detects biological information of a passenger on the seat or the driver gripping the steering wheel.

The communication unit 103 makes communication with the mobile object internal device 104, various devices outside the mobile object, a server, a base station, and the like, and transmits data supplied from each unit in the mobile object control system 100 or supplies received data to each unit in the mobile object control system 100. Additionally, a communication protocol supported by the communication unit 103 is not particularly limited, and the communication unit 103 can support a plurality of kinds of communication protocols.

For example, the communication unit 103 makes wireless communication with the mobile object internal device 104 via wireless LAN, Bluetooth (registered trademark), near field communication (NFC), wireless USB (WUSB), or the like. Further, for example, the communication unit 103 makes wired communication with the mobile object internal device 104 via a connection terminal (not illustrated) (and cable as necessary) by use of universal serial bus (USB), high-definition multimedia interface (HDMI), mobile high-definition link (MHL), or the like.

Further, for example, the communication unit 103 makes communication with a device (such as application server or control server) present on an external network (such as Internet, Cloud network, or provider-specific network) via a base station or access point. Further, for example, the communication unit 103 makes communication with a terminal (such as pedestrian's or shop's terminal, or machine type communication (MTC) terminal) present near the mobile object by the peer to peer (P2P) technology. Further, for example, in a case where the mobile object 91 is a vehicle, the communication unit 103 makes V2X communication such as vehicle to vehicle communication, vehicle to infrastructure communication, vehicle to home communication, and vehicle to pedestrian communication. Further, for example, the communication unit 103 includes a beacon reception unit, and receives a radio wave or electromagnetic wave originated from a wireless station or the like installed on the road thereby to acquire information such as current position, traffic jam, traffic rule, or necessary time.

The mobile object internal device 104 includes a mobile device or wearable device owned by a passenger, an information device mounted or attached on the mobile object, a navigation device configured to search a route to any destination, and the like, for example.

The output control unit 105 controls outputting various items of information to a passenger of the mobile object or the outside of the mobile object. For example, the output control unit 105 generates an output signal including at least one of visual information (such as image data) and auditory information (such as audio data) and supplies it to the output unit 106 thereby to control outputting the visual information and the auditory information from the output unit 106. Specifically, for example, the output control unit 105 combines image data shot by a different shooting device in the data acquisition unit 102, generates a perspective image, panorama image, or the like, and supplies an output signal including the generated image to the output unit 106. Further, for example, the output control unit 105 generates audio data including an alarm sound or alarm message against danger such as collision, contact, entry into danger zone, and the like, and supplies an output signal including the generated audio data to the output unit 106.

The output unit 106 includes a device capable of outputting visual information or auditory information to a passenger of the mobile object or the outside of the mobile object. For example, the output unit 106 includes a display device, an instrument panel, an audio speaker, a headphone, a wearable device such as glasses-type display put on a passenger, a projector, a lamp, and the like. The display device provided in the output unit 106 may be, for example, a device configured to display visual information within a field of view of the driver such as a headup display, a transmissive display, or a device having an augmented reality (AR) display function in addition to a device having a normal display.

The drive system control unit 107 generates various control signals and supplies them to the drive system 108 thereby to control the drive system 108. Further, the drive system control unit 107 supplies the control signals to each unit other than the drive system 108 as necessary, notifies a control state of the drive system 108, and the like.

The drive system 108 includes various devices for the drive system of the mobile object. The drive system 108 includes a drive force generator configured to generate a drive force such as internal engine or drive motor, a drive force transmission mechanism configured to transmit a drive force to the wheels, a steering mechanism configured to adjust a steering angle, a braking device configured to generate a braking force, an antilock brake system (ABS), an electronic stability control (ESC), a power-assisted power steering device, and the like, for example.

The storage unit 109 includes, for example, a magnetic storage device such as read only memory (ROM), random access memory (RAM), or hard disc drive (HDD), a semiconductor storage device, an optical storage device, a magnetooptical storage device, and the like. The storage unit 109 stores various programs or data used in each unit of the mobile object control system 100. For example, the storage unit 109 stores map data such as a high-definition map such as dynamic map, a global map which is less accurate than high-definition map and is directed for covering a wider area, a local map including information around the mobile object, and the like.

The automatic driving control unit 110 controls automatic driving such as autonomous movement or driving assistance. Specifically, for example, the automatic driving control unit 110 conducts cooperative control for realizing the functions of an advanced driver assistance system (ADAS) including such as collision avoidance or impact relaxation of the mobile object, follow-up movement based on inter-mobile object distance, movement with mobile object speed kept, collision alarm of the mobile object, or lane deviation alarm of the mobile object. Further, for example, the automatic driving control unit 110 conducts cooperative control for automatic driving such as autonomous movement irrespective of driver's operation. The automatic driving control unit 110 includes a detection unit 131, a self-position estimation unit 132, a situation analysis unit 133, a planning unit 134, and an operation control unit 135.

The detection unit 131 detects various items of information necessary for controlling automatic driving. The detection unit 131 includes a mobile object external information detection unit 141, a mobile object internal information detection unit 142, and a mobile object state detection unit 143.

The mobile object external information detection unit 141 performs a processing of detecting external information of the mobile object on the basis of data or a signal from each unit in the mobile object control system 100. For example, the mobile object external information detection unit 141 performs a processing of detecting an object around the mobile object, a recognition processing, and a tracking processing as well as a processing of detecting a distance to an object. The objects to be detected include other mobile object, person, obstacle, structure, road, traffic light, traffic sign, road sign, and the like, for example. Further, for example, the mobile object external information detection unit 141 performs a processing of detecting an environment around the mobile object. The surrounding environments to be detected include weather, temperature, humidity, brightness, road state, and the like, for example. The mobile object external information detection unit 141 supplies the data indicating the results of the detection processing to the self-position estimation unit 132, a map analysis unit 151 and a situation recognition unit 152 in the situation analysis unit 133, an emergency avoidance unit 171 in the operation control unit 135, and the like.

The mobile object internal information detection unit 142 performs a processing of detecting internal information of the mobile object on the basis of data or a signal from each unit in the mobile object control system 100. For example, the mobile object internal information detection unit 142 performs the processing of authenticating and recognizing the driver, a processing of detecting a state of the driver, a processing of detecting a passenger, a processing of detecting an environment inside the mobile object, and the like. The states of the driver to be detected include physical condition, degree of wakefulness, degree of concentration, degree of fatigue, eye direction, and the like, for example. The environments inside the mobile object to be detected include temperature, humidity, brightness, odor, and the like, for example. The mobile object internal information detection unit 142 supplies the data indicating the results of the detection processing to the situation recognition unit 152 in the situation analysis unit 133, the emergency avoidance unit 171 in the operation control unit 135, and the like.

The mobile object state detection unit 143 performs a processing of detecting a state of the mobile object on the basis of data or a signal from each unit in the mobile object control system 100. The states of the mobile object to be detected include speed, acceleration, steering angle, presence and contents of abnormality, driving operation state, position and tilt of power sheet, door lock state, state of other mobile object-mounted device, and the like, for example. The mobile object state detection unit 143 supplies the data indicating the results of the detection processing to the situation recognition unit 152 in the situation analysis unit 133, the emergency avoidance unit 171 in the operation control unit 135, and the like.

The self-position estimation unit 132 performs a processing of estimating a position, a posture, and the like of the mobile object on the basis of data or a signal from each unit in the mobile object control system 100 such as the mobile object external information detection unit 141 and the situation recognition unit 152 in the situation analysis unit 133. Further, the self-position estimation unit 132 generates a local map used for estimating a self-position (which will be denoted as self-position estimation map below) as necessary. The self-position estimation map is assumed as a high-definition map using a technology such as simultaneous localization and mapping (SLAM), for example. The self-position estimation unit 132 supplies the data indicating the result of the estimation processing to the map analysis unit 151 and the situation recognition unit 152 in the situation analysis unit 133, and the like. Further, the self-position estimation unit 132 stores a self-position estimation map in the storage unit 109.

The situation analysis unit 133 performs a processing of analyzing the situations of the mobile object and its surroundings. The situation analysis unit 133 includes the map analysis unit 151, the situation recognition unit 152, and a situation prediction unit 153.

The map analysis unit 151 performs a processing of analyzing various maps stored in the storage unit 109 by use of data or a signal from each unit in the mobile object control system 100 such as the self-position estimation unit 132 and the mobile object external information detection unit 141 as necessary, and constructs a map including information necessary for the automatic driving processing. The map analysis unit 151 supplies the constructed map to the situation recognition unit 152 and the situation prediction unit 153 as well as a route planning unit 161, an action planning unit 162, an operation planning unit 163 in the planning unit 134, and the like.

The situation recognition unit 152 performs a processing of recognizing a situation of the mobile object on the basis of data or a signal from each unit in the mobile object control system 100 such as the self-position estimation unit 132, the mobile object external information detection unit 141, the mobile object internal information detection unit 142, the mobile object state detection unit 143, and the map analysis unit 151. For example, the situation recognition unit 152 performs a processing of recognizing a situation of the mobile object, a situation around the mobile object, a situation of the driver of the mobile object, and the like. Further, the situation recognition unit 152 generates a local map used for recognizing a situation around the mobile object (which will be denoted as situation recognition map below) as necessary. The situation recognition map is assumed as an occupancy grid map, for example.

The situations of the mobile object to be recognized include position, posture, and motion (such as speed, acceleration, and moving direction) of the mobile object as well as presence, contents, and the like of an abnormality, for example. The situations around the mobile object to be recognized include kind and position of a surrounding still object, kind, position, and motion of a surrounding moving object (such as speed, acceleration, and moving direction), structure of surrounding road, and state of the road, as well as surrounding weather, temperature, humidity, brightness, and the like. The states of the driver to be recognized include physical condition, degree of wakefulness, degree of concentration, degree of fatigue, motion of line of sight, driving operation, and the like, for example.

The situation recognition unit 152 supplies the data (including a situation recognition map as necessary) indicating the results of the recognition processing to the self-position estimation unit 132, the situation prediction unit 153, and the like. Further, the situation recognition unit 152 stores the situation recognition map in the storage unit 109.

The situation prediction unit 153 performs a processing of predicting a situation of the mobile object on the basis of data or a signal from each unit in the mobile object control system 100 such as the map analysis unit 151 and the situation recognition unit 152. For example, the situation prediction unit 153 performs a processing of predicting a situation of the mobile object, a situation around the mobile object, a situation of the driver, and the like.

The situations of the mobile object to be predicted include behavior of the mobile object, occurrence of abnormality, movable distance, and the like, for example. The situations around the mobile object to be predicted include behavior of a moving object around the mobile object, change in signal state, change in environment such as weather, and the like, for example. The situations of the driver to be predicted include behavior, physical condition, and the like of the driver, for example.

The situation prediction unit 153 supplies the data indicating the results of the prediction processing to the route planning unit 161, the action planning unit 162, the operation planning unit 163 in the planning unit 134 together with the data from the situation recognition unit 152, and the like.

The route planning unit 161 plans a route to a destination on the basis of data or a signal from each unit in the mobile object control system 100 such as the map analysis unit 151 and the situation prediction unit 153. For example, the route planning unit 161 sets a route from a current position to a designated destination on the basis of the global map. Further, for example, the route planning unit 161 changes the route as necessary on the basis of situations of traffic jam, accident, traffic regulation, construction, and the like and physical condition of driver. The route planning unit 161 supplies the data indicating the planned route to the action planning unit 162 and the like.

The action planning unit 162 plans an action of the mobile object in order to safely move along the route planned by the route planning unit 161 within the planned time on the basis of data or a signal from each unit in the mobile object control system 100 such as the map analysis unit 151 and the situation prediction unit 153. For example, the action planning unit 162 plans start, stop, traveling direction (such as forward travel, backward travel, left turn, right turn, and change in direction), moving speed, overtaking, and the like. The action planning unit 162 supplies the data indicating the planned action of the mobile object to the operation planning unit 163 and the like.

The operation planning unit 163 plans an operation of the mobile object in order to realize an action planned by the action planning unit 162 on the basis of data or a signal from each unit in the mobile object control system 100 such as the map analysis unit 151 and the situation prediction unit 153. For example, the operation planning unit 163 plans acceleration, deceleration, moving trajectory, and the like. The operation planning unit 163 supplies the data indicating the planned operation of the mobile object to the operation control unit 135 and the like.

The operation control unit 135 controls the operations of the mobile object.

More specifically, the operation control unit 135 performs a processing of detecting emergency situations such as collision, contact, entry into danger zone, abnormality of the driver, and abnormality of the mobile object on the basis of the detection results of the mobile object external information detection unit 141, the mobile object internal information detection unit 142, and the mobile object state detection unit 143. In a case where the operation control unit 135 detects an occurrence of an emergency, it plans an operation of the mobile object in order to avoid the emergency such as sudden stop or steep turn.

Further, the operation control unit 135 controls acceleration/deceleration in order to realize an operation of the mobile object planned by the operation planning unit 163. For example, the operation control unit 135 calculates a control target value of the drive force generator or the braking device for realizing planned acceleration, deceleration, or sudden stop, and supplies a control command indicating the calculated control target value to the drive system control unit 107.

The operation control unit 135 conducts direction control in order to realize an operation of the mobile object planned by the operation planning unit 163. For example, the operation control unit 135 calculates a control target value of the steering mechanism in order to realize moving trajectory or steep turn planned by the operation planning unit 163, and supplies a control command indicating the calculated control target value to the drive system control unit 107.

Exemplary Configuration of Environment Map Generation

A detailed exemplary configuration of environment map generation in the mobile object control system 100 of FIG. 4 will be described below with reference to FIG. 5. Additionally, an environment map described herein is a local map used for recognizing a situation around the mobile object described above, or a situation recognition map, and more specifically an occupancy grid map.

Figure 5:
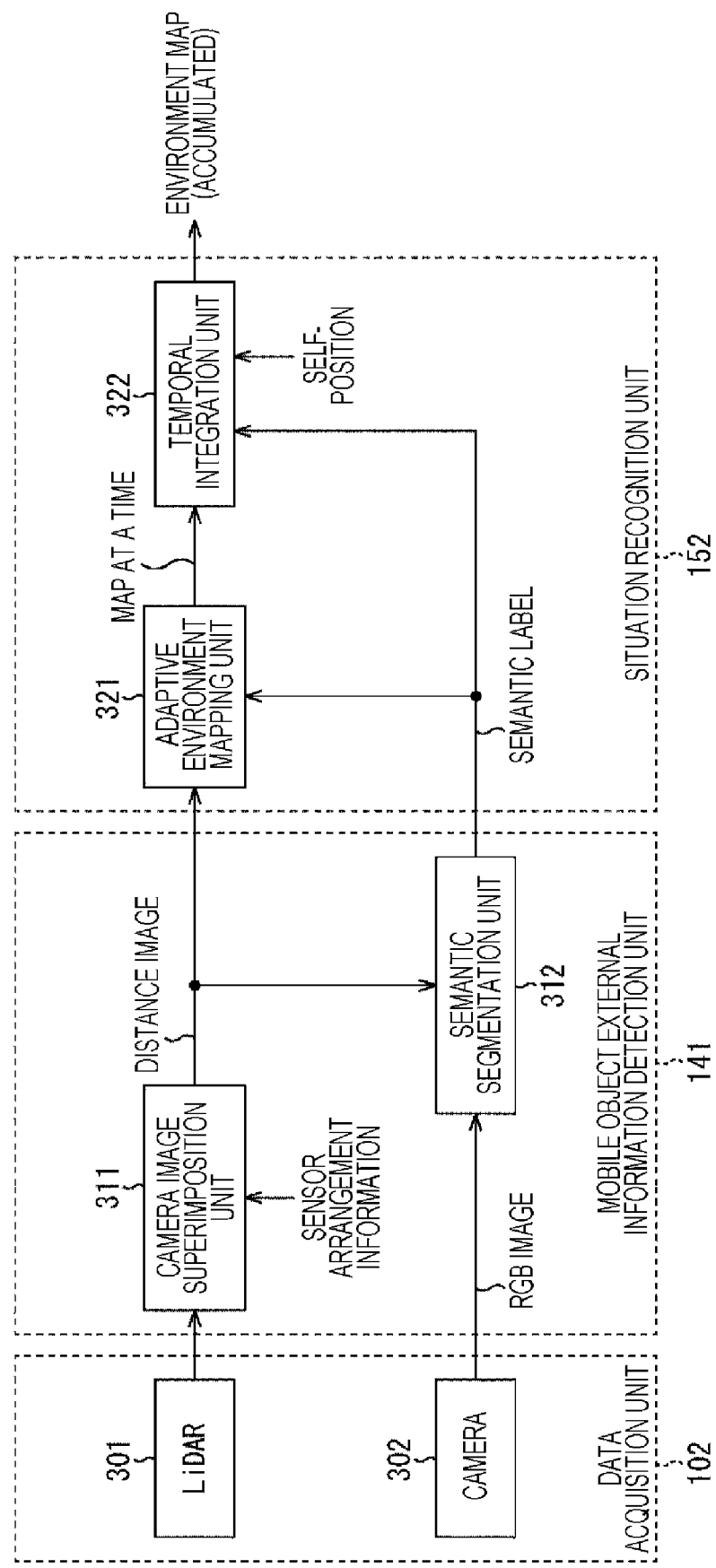
FIG. 5 is a block diagram for explaining an exemplary configuration of blocks for generating an environment map in the mobile object control system according to an embodiment of the present disclosure.

The detailed exemplary configuration of environment map generation is configured of the data acquisition unit 102, the mobile object external information detection unit 141 in the detection unit 131 in the automatic driving control unit 110, and the situation recognition unit 152 in the situation analysis unit 133 as illustrated in FIG. 5.

The data acquisition unit 102 includes the LiDAR 301 and the camera 302.

The mobile object external information detection unit 141 includes a camera image superimposition unit 311 and a semantic segmentation unit 312.

The situation recognition unit 152 includes an adaptive environment mapping unit 321 and a temporal integration unit 322.

The LiDAR 301 projects a laser light in a respective radial light projection direction L ahead in the moving direction of the mobile object 91 as illustrated in the upper part of FIG. 1 while horizontally rotating the light projection unit arranged at a plurality of angles in the vertical direction, and receives a light reflected on the obstacle 12 thereby to find a distance on the basis of a round-trip time as a difference between the light projection time and the reflected light reception time and to measure a distance and a direction to the obstacle 12.

The LiDAR 301 measures a distance from the mobile object 91 to the obstacle in each light projection direction in the so-called time of flight (ToF) method, and outputs the measurement result including a group of 3D points to the camera image superimposition unit 311.

Additionally, the LiDAR 301 may be configured such that light projection units and light reception units are provided in a 2D array to acquire 2D distance measurement information, and may be configured such that one light projection unit and one light reception unit two-dimensionally scans.

Further, any device, which can measure 2D distance measurement information capable of acquiring a group of 3D points, can be employed other than the LiDAR 301, and a ToF camera and the like can be employed, for example.

The camera 302 is configured of a shooting device such as complementary metal oxide semiconductor (CMOS), shoots in front of the mobile object 91 and makes image correction such as demosaic processing or distortion correction based on a pre-calibration result, and then outputs the corrected RGB image to the semantic segmentation unit 312.

The camera image superimposition unit 311 converts the distance measurement result of the LiDAR 301 from the coordinate system information of the LiDAR 301 to the coordinate system information of the camera 302 to be a distance image corresponding to the image shot by the camera 302, and outputs the distance image to the semantic segmentation unit 312 and the adaptive environment mapping unit 321.

The semantic segmentation unit 312 classifies the types of subjects in units of pixel by semantic segmentation on the basis of the RGB image shot by the camera 302 and the distance image, gives a semantic label corresponding to a classification result to them, and outputs them to the adaptive environment mapping unit 321 and the temporal integration unit 322. Additionally, both an RGB image and a distance image are not necessary for semantic segmentation, and semantic segmentation may be performed by only an RGB image or may be performed by only a distance image. Further, not an RGB image but a monochrome image may be employed, for example. However, semantic segmentation using both an RGB image (or monochrome image) and a distance image is more accurate.

The adaptive environment mapping unit 321 generates an environment map at a current time by the environment adaptive mapping processing on the basis of the distance image and the semantic labels given in units of pixel, and outputs the generated environment map to the temporal integration unit 322.

The temporal integration unit 322 accumulates and integrates the environment maps which are sequentially generated in time series and supplied by the adaptive environment mapping unit 321 thereby to configure a global map, and outputs the global map as a final environment map.

Superimposition of Group of 3D Points as Measurement Result of LiDAR on Image

A measurement result of the LiDAR 301 is information indicating a group of points in a 3D space, and the measurement result is superimposed on an image shot by the camera 302 thereby to generate a distance image.

Figure 6:
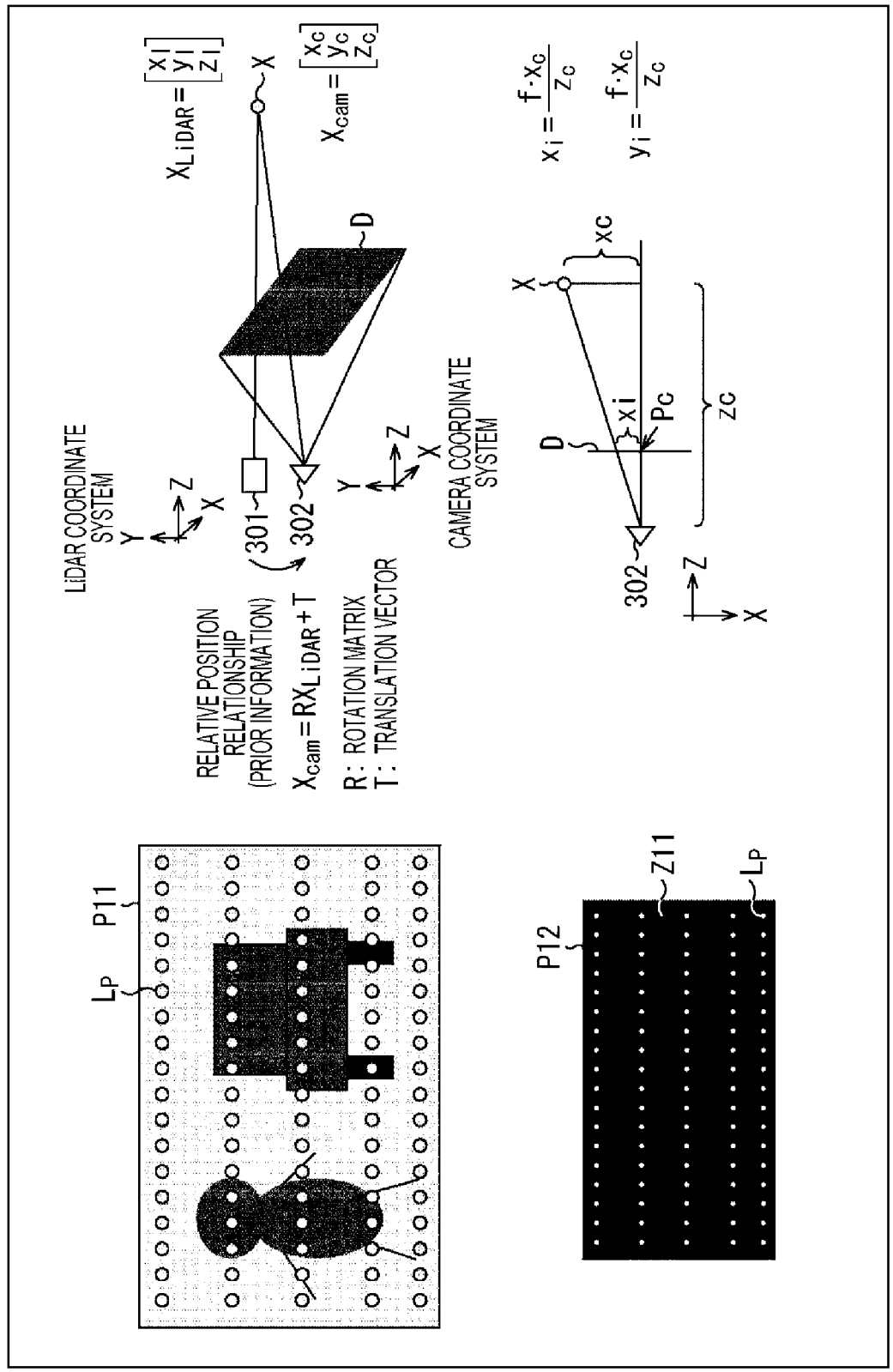
FIG. 6 is a diagram for explaining how to convert the coordinate systems of the LiDAR and the camera.

For example, a measurement result in each light projection direction Lp of the LiDAR 301 is superimposed on an image P11 by the camera 302 illustrated in the upper left of FIG. 6 thereby to generate a distance image.

The camera image superimposition unit 311 acquires, as prior information, the information indicating the relative positions of the LiDAR 301 and the camera 302 as well as the center of the image and the focal distance of the camera 302, thereby generating a distance image by the following calculations using the prior information.

At first, the camera image superimposition unit 311 integrates the coordinate system of the LiDAR 301 with the coordinate system of the camera 302.

That is, as illustrated in the upper right of FIG. 6, a relative position relationship between a coordinate $X_{LiDAR}$ (=transposed matrix of [xl, yl, zl]) as a coordinate system of the LiDAR 301 and a coordinate $X_{cam}$ (=transposed matrix of [xc, yc, zc]) on the shooting plane D of the coordinate system of the camera 302 is known as prior information by calibration, and is found as the following Equation (1), for example.

$$X_{cam} = RX_{LiDAR} + T \quad (1)$$

Here, R indicates a rotation matrix indicating rotation previously known by calibration between the LiDAR 301 and the camera 302, and T indicates a translation vector also previously known by calibration.

The above Equation (1) is calculated so that the coordinate of the point X in the measurement result measured as coordinate system information of the LiDAR 301 is converted into the camera coordinate system.

The camera image superimposition unit 311 then associates the distance measurement result of the LiDAR 301 with the coordinate system on the shooting plane of the camera 302.

That is, when the position $X_{cam}$ (=[xc, yc, zc] transposition) of an obstacle detected by the LiDAR 301 is found, the coordinate xi in the image plane can be found as in the following Equation (2) with reference to the image center Pc of the shooting plane D of the obstacle in the shooting plane D as illustrated in the lower right of FIG. 6.

$$xi = f \times xc/zc \quad (2)$$

where f is a focal distance of the camera 302.

Further, the coordinate yi can be similarly found in the following Equation (3).

$$yi = f \times yc/zc \quad (3)$$

Consequently, the position of the obstacle on the shooting plane D can be specified.

That is, the coordinate $X_{LiDAR}$ (=[$x_l$, $y_l$, $z_l$]) of the 3D point detected by the LiDAR 301 is converted into the coordinate $X_{cam}$ (=[$x_c$, $y_c$, $z_c$]) of the 3D point in the coordinate system of the camera 302 in the light projection direction. Further, the coordinate (xi, yi) on the shooting plane around the shooting plane D corresponding to the coordinate $X_{cam}$ (=[$x_c$, $y_c$, $z_c$]) of the 3D point in the coordinate system of the camera 302 is calculated on the basis of the focal distance f of the camera 302 in the Equation (2) and the Equation (3).

The camera image superimposition unit 311 generates a distance image P12 as illustrated in the lower left of FIG. 6 in the processing.

The distance image P12 is assumed to be arranged at the same pixels as the image of the camera 302, where the pixels, which are in the light projection direction of the LiDAR 301 and have a distance measurement result due to the coordinate system conversion, among the pixels (xi, yi) are associated and their distance data (zc in the lower right of FIG. 6) is stored, and the pixels, which are not in the light projection direction and do not have a distance measurement result, are stored with distance data of 0, for example.

Semantic Segmentation

Semantic segmentation by the semantic segmentation unit 312 will be described below with reference to FIG. 7.

Figure 7:
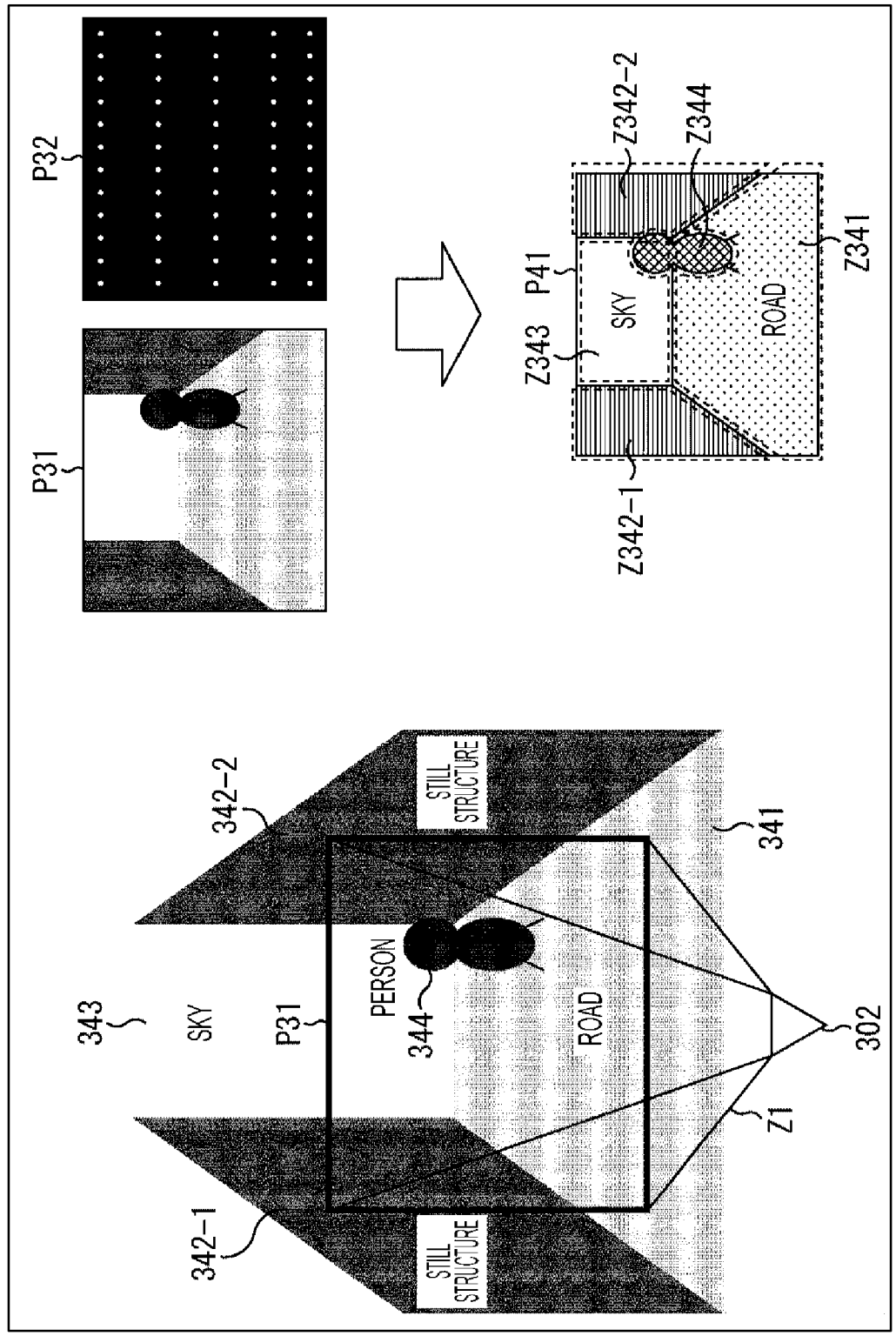
FIG. 7 is a diagram for explaining semantic segmentation.

For example, it is assumed that the camera 302 shoots an image P31 including an RGB image at an angle of view Z1 in which a road 341 is present in a space horizontally sandwiched by still structures 342-1 and 342-2, a person 344 is present on the road 341, and sky 343 is present in the back as illustrated on the left of FIG. 7.

The semantic segmentation unit 312 classifies and labels the kinds of the subjects in the image P31 in units of pixels by machine learning such as deep learning on the basis of the image P31 including an RGB image and a distance image P32 as illustrated in the upper middle of FIG. 7.

In the case of the image P31 including an RGB image and the distance image P32 illustrated in the upper right of FIG. 7, classification and labeling are performed by semantic segmentation as illustrated in a labeling image P41 in the lower right of FIG. 7, for example.

That is, in the labeling image P41, the pixels belonging to a region Z341 at the bottom of the image are classified as the road 341, the pixels belonging to regions Z342-1 and Z342-2 are classified as the horizontal still structures 342-1 and 342-2, respectively, the pixels belonging to a region Z343 is classified as the sky 343 above in the back, and the pixels belonging to a region Z344 are classified as the person 344.

The semantic segmentation unit 312 identifies and labels, for example, roads, still structures (such as wall, guardrail, tree, and telephone pole), vehicles (such as automobile, truck and bus), two wheels (such as bike and bicycle), persons, horizontal bars (such as railroad crossing, ETC bar, and parking gate bar), and the sky in an RGB image, in units of pixels other than the examples of FIG. 7 on the basis of an RGB image and a distance image.

Additionally, semantic segmentation is possible for classifying subjects through machine learning by only an RGB image or by only a distance image, but is less accurate than in combination of an RGB image and a distance image.

Adaptive Environment Mapping (for Road)

Adaptive environment mapping by the adaptive environment mapping unit 321 will be described below with reference to FIG. 8.

The adaptive environment mapping unit 321 adaptively generates an environment map on the basis of the distance image, and the semantic labels classified per subject by semantic segmentation.

More specifically, in a case where a distance image is present for each pixel corresponding to an RGB image shot by the camera 302, the adaptive environment mapping unit 321 can generate an environment map by use of the information.

As described above, however, a distance is found by the LiDAR 301 only in the discrete range indicated in dots as illustrated in the distance image P12 of FIG. 6.

Thus, the adaptive environment mapping unit 321 interpolates and generates distance information and generates a higher-definition distance image for each pixel of the RGB image.

There will be described herein with reference to FIG. 8 the way the adaptive environment mapping unit 321 interpolates and generates distance information for pixels without distance information by use of known distance information for each pixel in a region classified with a semantic label of road.

Figure 8:
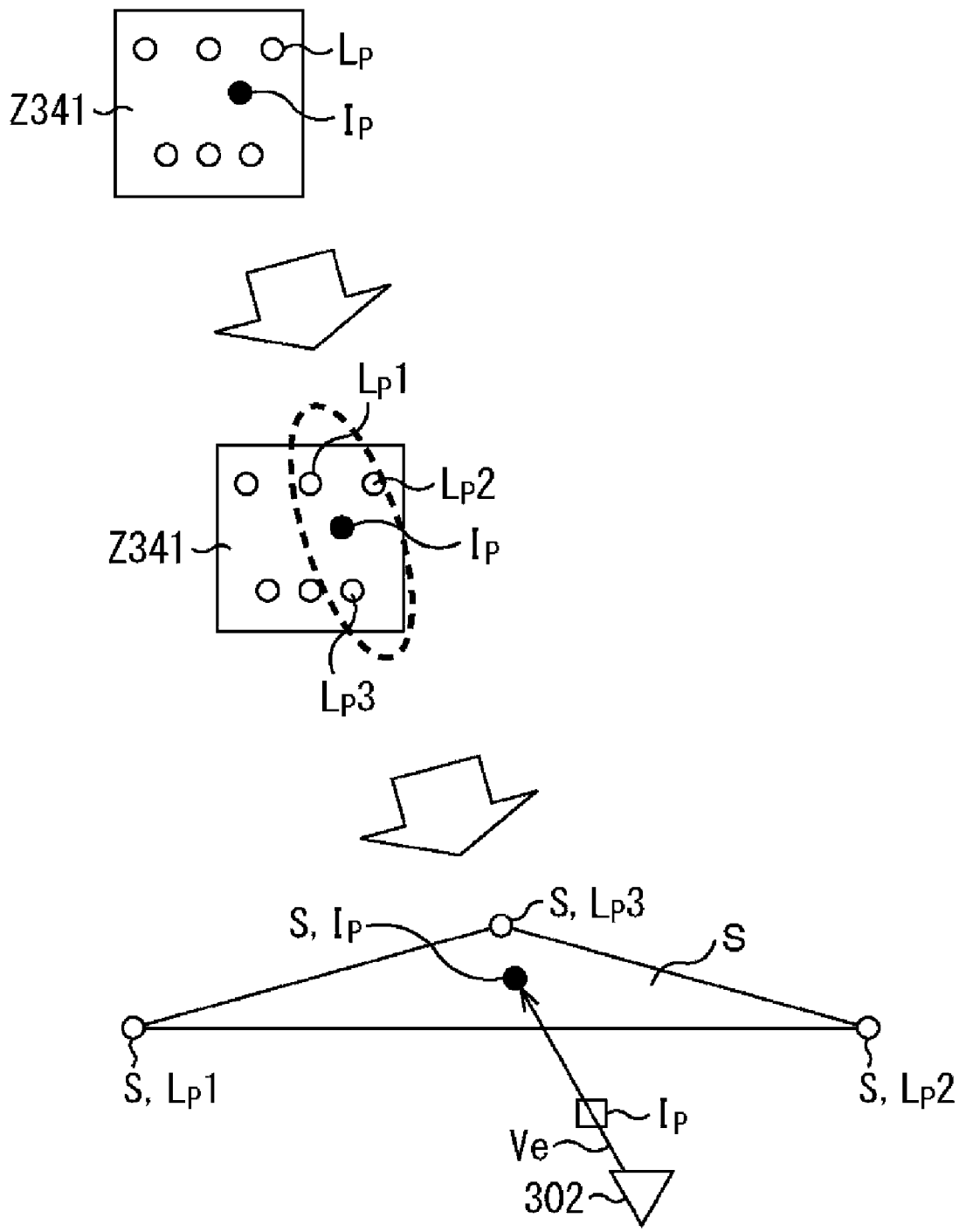
FIG. 8 is a diagram for explaining a road distance information correction method by adaptive environment mapping.

In interpolating and generating distance information corresponding to a pixel Ip in the region Z341 classified with a semantic label of road as illustrated in the upper part of FIG. 8, the adaptive environment mapping unit 321 reads the coordinates S(Lp1) to S(Lp3) in the 3D space of the pixels Lp1 to Lp3 having distance information nearest to the pixel Ip as illustrated in the range surrounded in a dotted line in the middle of FIG. 8.

A plane can be specified by three known points, and the adaptive environment mapping unit 321 finds a plane S configuring the road 341 defined in the following Equation (4) on the basis of the information indicating the coordinates S(Lp1) to S(Lp3) in the 3D space of the pixels Lp1 to Lp3 as illustrated in the lower part of FIG. 8.

[Math. 1]

$$N^T X + d = 0 \quad (4)$$

$$N = \begin{bmatrix} n_x \\ n_y \\ n_z \end{bmatrix} : \text{Normal vector}$$

$$X = \begin{bmatrix} x \\ y \\ z \end{bmatrix} : \text{Coordinates of 3D points}$$

$d$: Coefficient

Figure 9:
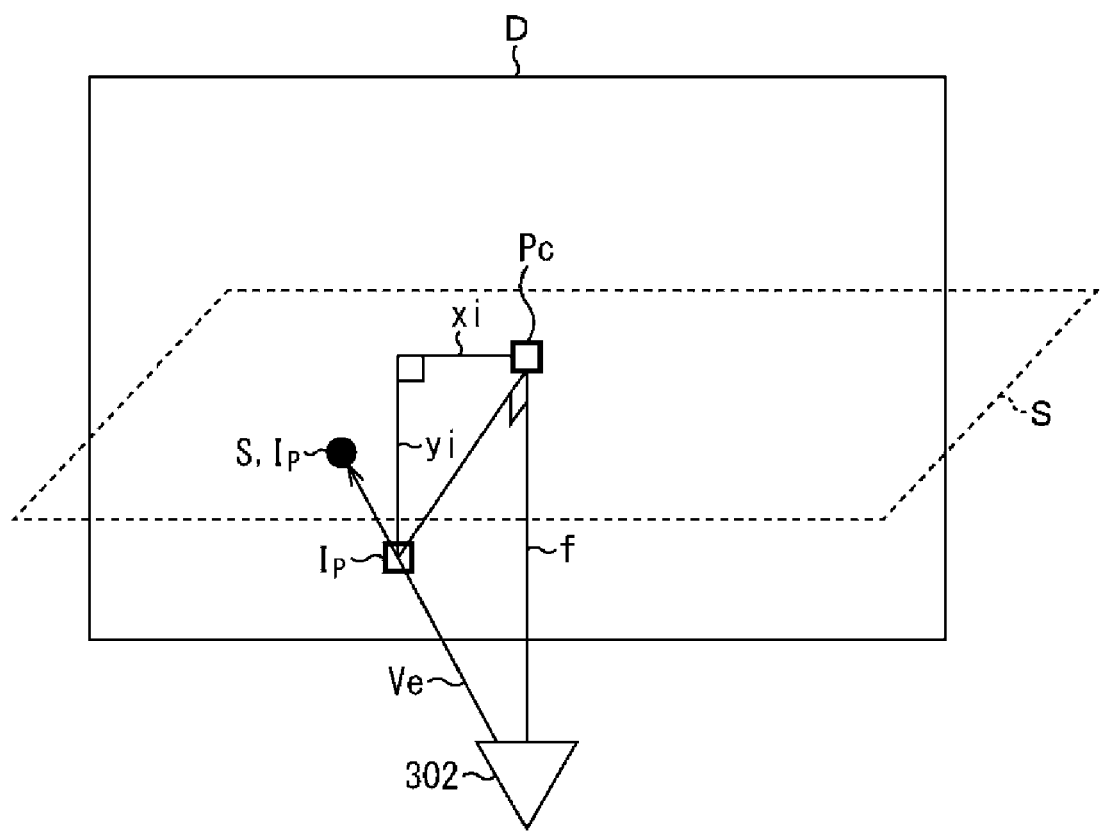
FIG. 9 is a diagram for explaining the road distance information correction method by adaptive environment mapping.

The adaptive environment mapping unit 321 then finds the coordinate S(Ip) corresponding to the pixel Ip on the plane S configuring the road 341 on the basis of an eye vector Ve from the camera 302 to the pixel Ip as illustrated in FIG. 9.

That is, an intersection point S(Ip) corresponding to the pixel Ip on the plane S con-figuring the road 341 from the viewpoint of the camera 302 is indicated in the following Equation (5).

[Math. 2]

$$\text{Intersection point with plane: } S(I_p) = s \begin{bmatrix} xi \\ yi \\ f \end{bmatrix} \quad (5)$$

Here, s indicates a coefficient or the scalar amount. Further, xi and yi indicate the coordinates of the pixel Ip on the shooting plane with the image center of the shooting plane D as origin, and f indicates a focal distance. That is, a vector to the intersection point S(Ip) with the camera 302 as start point is a multiple of the coefficient s of the eye vector Ve. Thus, the Equation (5) is substituted in the Equation of the plane S configuring the road, which is defined in the Equation (4), thereby to find a constant s, and the constant s is found thereby to find the coordinate of the intersection point S(Ip) on the plane S.

Adaptive Environment Mapping (for Obstacle Such as Still Structure or Person)

There will be described below with reference to FIG. 10 the way the adaptive environment mapping unit 321 interpolates and generates distance information for pixels without distance information by use of known distance information among the pixels in a region classified with a semantic label of obstacle such as still structure or person.

Additionally, how to interpolate and generate distance information of the pixels in the region Z342-2 of the still structure 342-2 will be described herein as illustrated on the left of FIG. 10.

Figure 10:
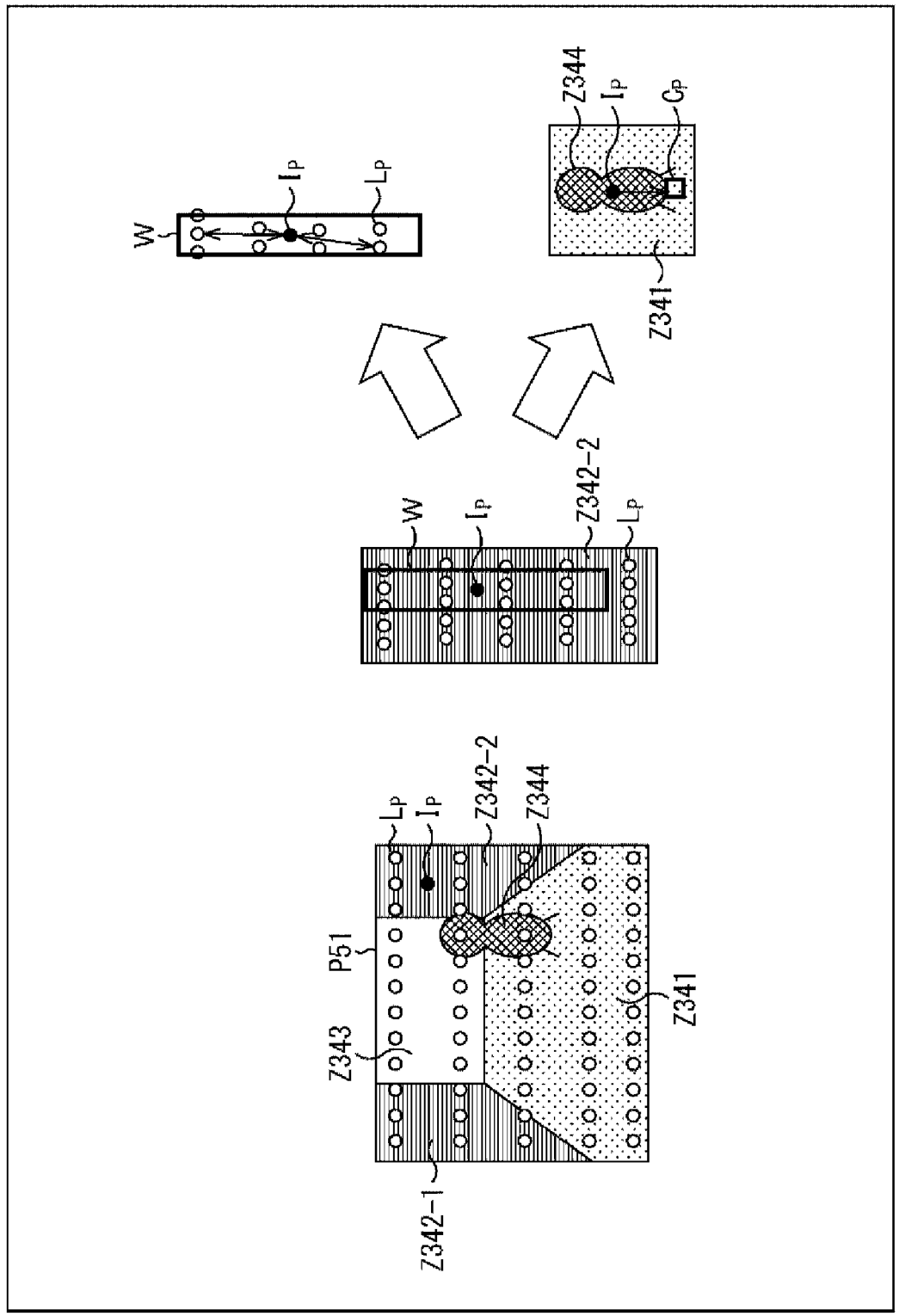
FIG. 10 is a diagram for explaining an obstacle distance information correction method by adaptive environment mapping.

In interpolating and generating distance information corresponding to the pixel Ip in the region Z342-2 classified with a semantic label of still structure 342-2 as illustrated on the left of FIG. 10, the adaptive environment mapping unit 321 reads the coordinates in the 3D space of the pixels with known distance information indicated in white dots in the range surrounded by a vertically-long frame W around the pixel Ip as illustrated in the middle of FIG. 10.

Here, the frame W is set in a vertically-long range around the pixel Ip indicated in a black dot for which distance information is interpolated and generated since many subjects are likely to have the same distance information in the vertical direction in the region with the same label.

In a case where the pixels with known distance information indicated in white dots are present in the range surrounded in the frame W in the region Z342-2 with the same label, the adaptive environment mapping unit 321 reads the information indicating the coordinates in the 3D space of the known pixels, and interpolates and generates the coordinate in the 3D space of the pixel Ip by use of the read information as illustrated in the upper right of FIG. 10. At this time, the adaptive environment mapping unit 321 interpolates and generates the coordinate in the 3D space of the pixel Ip by a weighted linear sum depending on the position relationship from the pixel Ip by use of the information indicating the coordinates in the 3D space of the known pixels.

On the other hand, for example, in a case where a pixel with known distance information is not present around the pixel Ip for which distance information is to be interpolated and generated as in the region Z344 with the same label as illustrated in the lower right of FIG. 10, the adaptive environment mapping unit 321 determines whether the obstacle contacts with the region Z341 classified as the road 341 vertically below the region with the same label.

That is, an obstacle such as still structure or person stands on the road 341, and thus in a case where the obstacle contacts with the road 341 vertically below the region with the same label like a boundary Cp in the lower right of FIG. 10, the distance information can be assumed as the same as the distance information on the road 341 contacted vertically below the region with the same label. Thus, in a case where the obstacle contacts with the road 341 vertically below the region with the same label, the adaptive environment mapping unit 321 sets the same distance information as the distance information at the coordinate on the corresponding road 341 for the distance information of the pixel Ip. Additionally, the distance information of the road 341 makes use of the distance information of the road 341 found in the above method.

Further, in a case where the obstacle does not contact with the road 341 vertically below the region with the same label, the adaptive environment mapping unit 321 sets 0 indicating unknown for the distance information of the pixel Ip.

Adaptive Environment Mapping (for Horizontal Bar)

There will be described below with reference to FIG. 11 the way the adaptive environment mapping unit 321 interpolates and generates distance information for pixels without distance information by use of known distance information among the pixels in a region classified with a semantic label of horizontal bar used for entrance/exit gate or the like.

Figure 11:
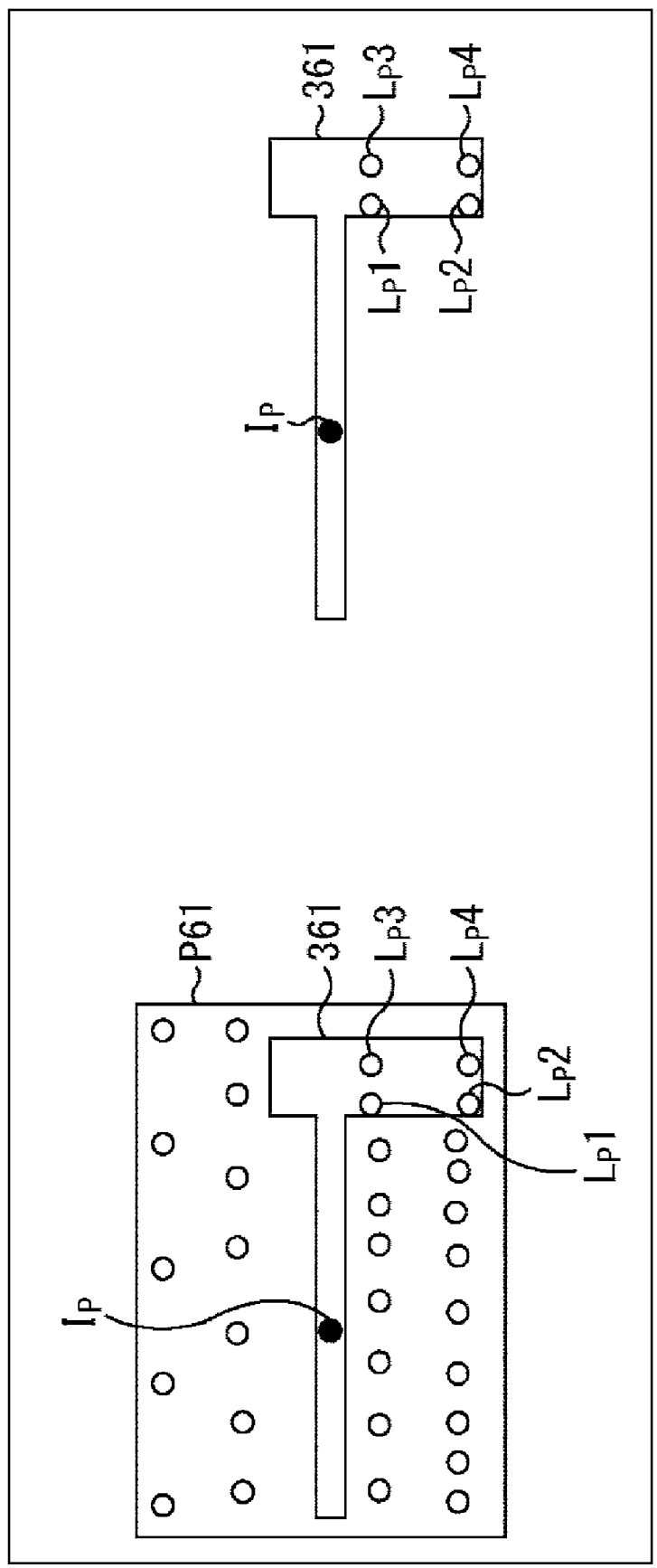
FIG. 11 is a diagram for explaining the obstacle distance information correction method by adaptive environment mapping.

As illustrated on the left of FIG. 11, in the case of a region Z361 classified with a semantic label of horizontal bar 361 used for entrance/exit gate or the like, the resolution is low in the LiDAR 301 or the like, and less pixels have distance information found.

In such a case, the adaptive environment mapping unit 321 uses the information indicating the pixels with distance information near the pixel Ip for which distance information is to be interpolated and generated in the region with the same label.

More specifically, as illustrated on the right of FIG. 11, the adaptive environment mapping unit 321 uses, as the distance information of the pixel Ip, the average value of the distance information of the pixels Lp1 to Lp4 with known distance information indicated in white dots, or the distance information of the nearest pixel Lp1 in the region Z361.

Adaptive Environment Mapping (for Sky)

There will be described below with reference to FIG. 12 the way the adaptive environment mapping unit 321 interpolates and generates distance information of each pixel in a region classified with a semantic label of sky.

Figure 12:
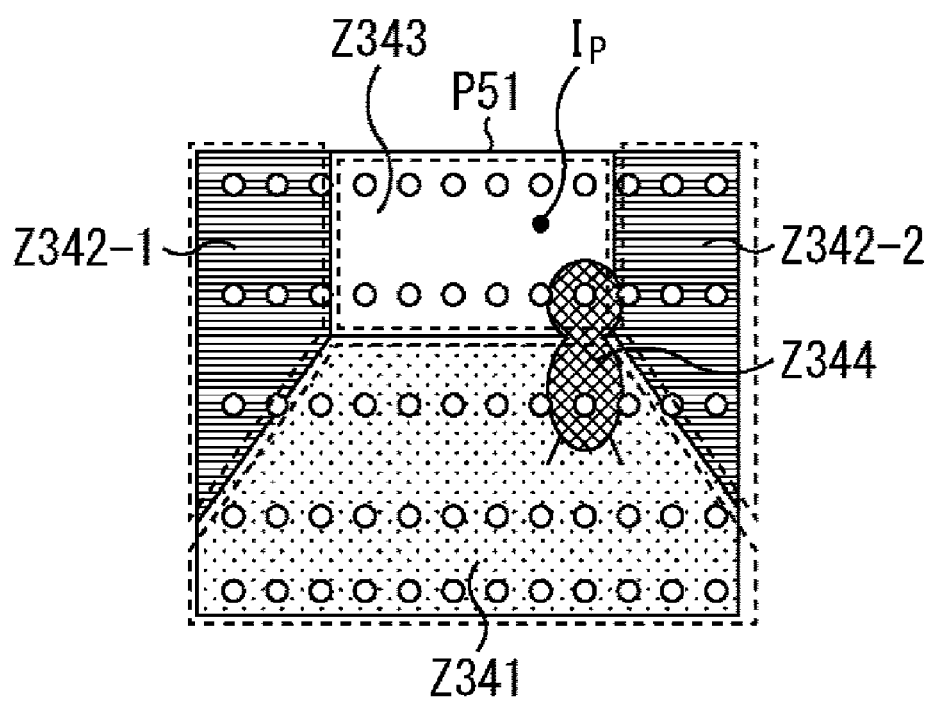
FIG. 12 is a diagram for explaining a sky distance information correction method by adaptive environment mapping.

As illustrated in a semantic label result P51 in FIG. 12, a distance may not be measured in many cases due to infinite distance, and if the distance is measured, noises due to sunlight or the like are caused in many cases in the region Z343 classified as the sky 343, and thus the adaptive environment mapping unit 321 gives the interpolation result of 0 indicating unknown to the distance information of the pixel Ip without distance information.

Adaptive Environment Mapping (Generation of Environment Map)

With the above processing, distance information is given to each pixel of an image shot by the camera 302 so that the adaptive environment mapping unit 321 generates an environment map.

More specifically, the adaptive environment mapping unit 321 sets a grid pattern on the plane (XZ plane) with horizontal direction and depth, and determines the presence of an obstacle per cell configured in the grid pattern on the basis of the distance information of each pixel, thereby completing an occupancy grid map.

That is, information indicating a distance and a direction in which a light projected by the LiDAR 301 is regarded as reflected on an obstacle is distance information in units of pixel, and thus a cell, in which an obstacle should be regarded as present in association with distance information, is present in each pixel if the distance information indicates road or is not 0 indicating unknown.

Thus, an obstacle such as still structure or person is likely to be present due to distance information in a cell in which an obstacle is regarded as present by many pixels.

Thus, the adaptive environment mapping unit 321 specifies, for each cell, a cell in which the number of pixels which are regarded as obstacle on the basis of distance information is higher than the predetermined number as a cell in which an obstacle is likely to be present. The black regions Z372-1, Z372-2, and Z373 are the regions of obstacles in the upper right of FIG. 13. Further, the regions Z372-1, Z372-2, and Z373 correspond to the still structures 372-1, 372-2, and a person 373 in a distance image P71 generated on the basis of the interpolated and generated distance information in the upper left of FIG. 13, respectively.

Further, a region Z371 indicating that an obstacle is not present (indicating a free space) is set in the range between the mobile object 91 and the regions Z372-1, Z372-2, and Z373 of the obstacles, and a region Z374 indicating unknown due to the absence of a distance measurement result is set in the range beyond the range in which the region Z373 is set.

Further, the adaptive environment mapping unit 321 generates a label map on the basis of the distance information and the semantic label information of each pixel of the image shot by the camera 302.

That is, the adaptive environment mapping unit 321 specifies, for each cell, a label for which the number of pixels with the same label is the highest as a label of the cell. The region Z341 in the lower right of FIG. 13 corresponds to the road 341 in a label image P72 configured of a semantic label in the lower left of FIG. 13. Further, the regions Z342-1 and Z342-2 in the lower right of FIG. 13 correspond to the still structures 372-1 and 372-2 in the lower left of FIG. 13, respectively. Further, the region Z344 in the lower right of FIG. 13 corresponds to the person 344 in the lower left of FIG. 13.

Temporal Integration of Environment Map

The adaptive environment mapping unit 321 generates environment maps in real-time and sequentially in time series, and the temporal integration unit 322 integrates the environment maps generated in time series in the temporal direction thereby to generate a global map, and outputs the global map as a final environment map.

Figure 14:
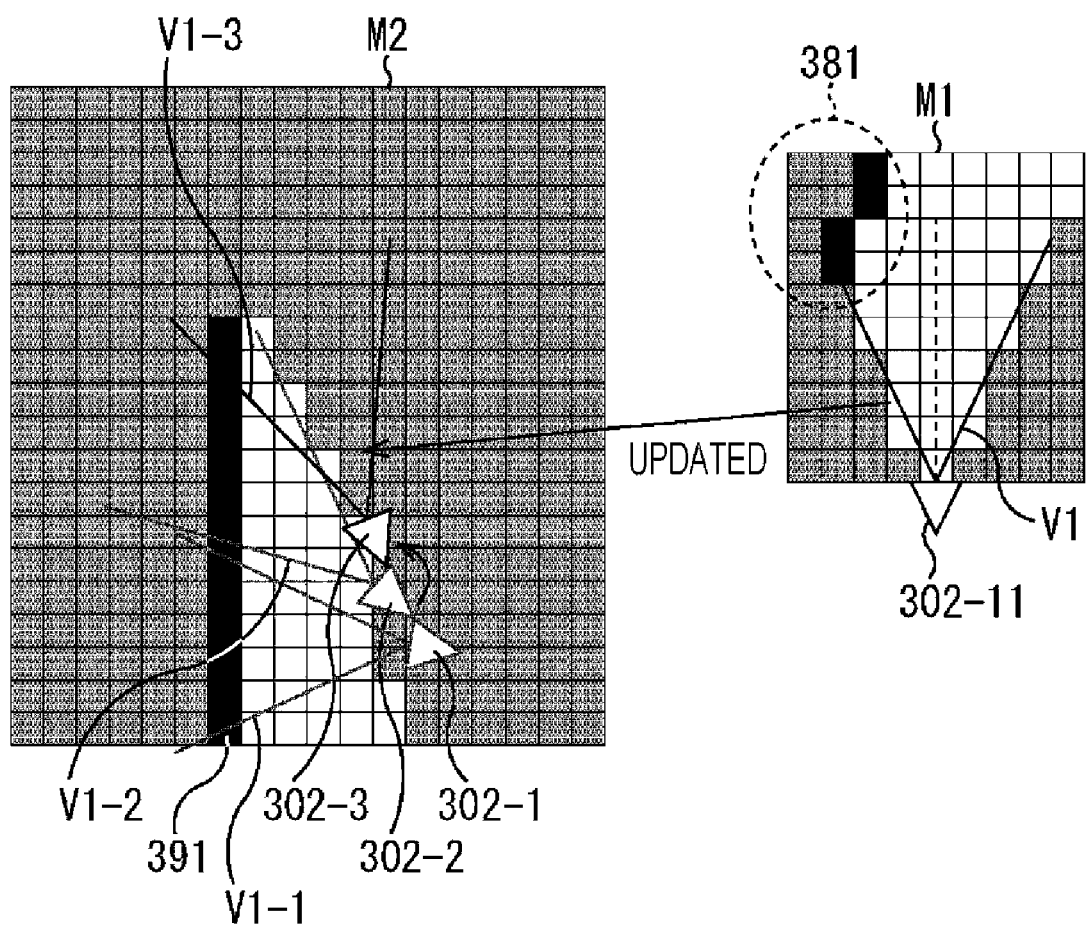
FIG. 14 is a diagram for explaining temporal integration of environment maps.

A global map is a map M2 configured by overlapping a plurality of environment maps M1 illustrated on the left of FIG. 14 on an environment map M1 generated in time series illustrated on the right of FIG. 14.

While the environment map M1 illustrates that the camera 302 shoots above in the lower part of the Figure, the global map M2 is configured by overlapping in time series an environment map V1-1 generated on the basis of an image shot by a camera 302-1 at time t1, an environment map V1-2 generated on the basis of an image shot by a camera 302-2 at time t2, and an environment map V1-3 generated on the basis of an image shot by a camera 302-3 at time t3. Additionally, on the left of FIG. 14, the environment maps V1-1 to V1-3 draw only the traced V1 indicating the angle of view of the environment map M1 on the right of FIG. 14 in time series, and is not an actual environment map.

Further, the environment map M1 on the right of FIG. 14 corresponds to the environment map V1-3 on the left of FIG. 14.

The environment maps are attached and accumulated in time series in this way so that the global map M2 is sequentially expanded. Thereby, for example, it is not possible to recognize how a cell 381 detected as an obstacle is as a whole at a current time as illustrated in the environment map M1, but it is possible to recognize that the cell 381 is like a still structure linearly arranged like a cell 391 by the global map M2 accumulated in time series. Consequently, it is possible to recognize a self-position or its surrounding situation.

Exemplary Configuration of Temporal Integration Unit

Figure 15:
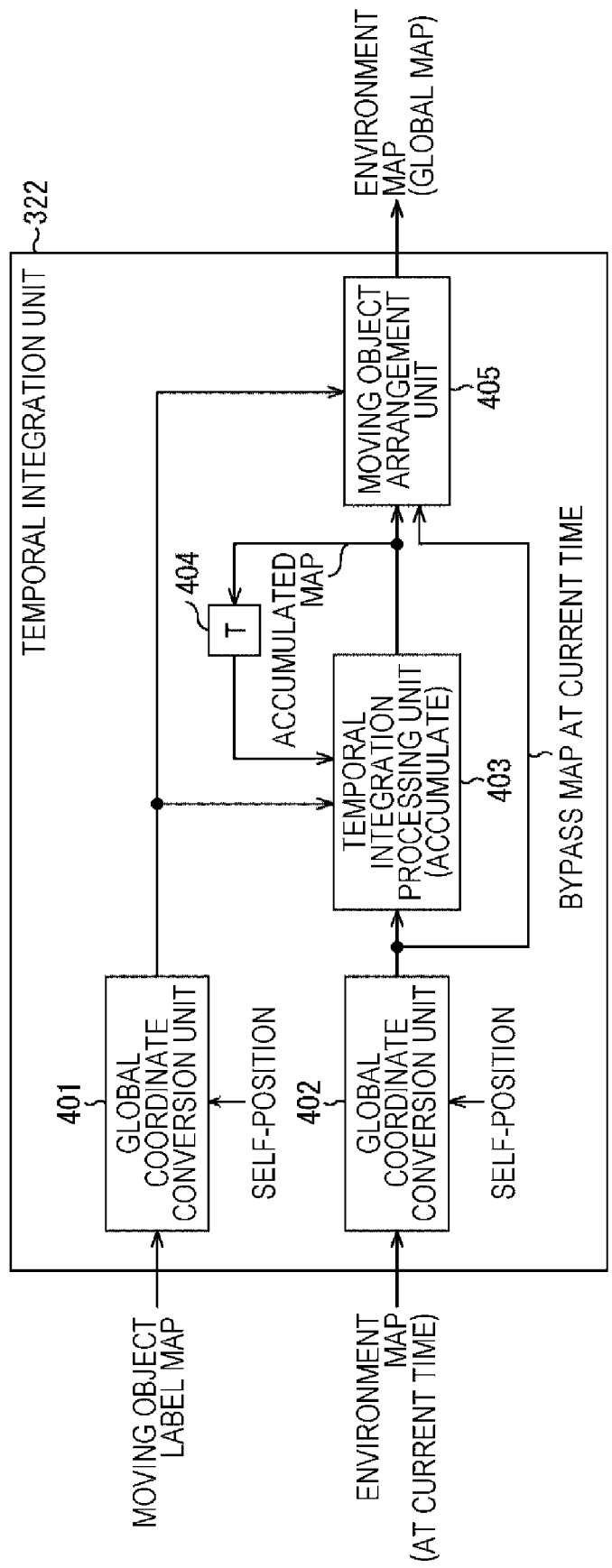
FIG. 15 is a diagram for explaining an exemplary configuration of a temporal integration unit.

FIG. 15 illustrates an exemplary configuration of the temporal integration unit 322. The temporal integration unit 322 includes global coordinate conversion units 401, 402, a temporal integration processing unit 403, a buffer 404, and a moving object arrangement unit 405.

The global coordinate conversion unit 401 converts a subject labeled as a moving object into a global coordinate as a global map coordinate system on the basis of self-position information, and outputs the global coordinate to the temporal integration processing unit 403 and the moving object arrangement unit 405. Additionally, if the first reference self-position is known, a self-position may be the amount of sequential change from a previous self-position.

The global coordinate conversion unit 402 converts an environment map into the global coordinate as a global map coordinate system on the basis of the self-position information, and outputs the global coordinate to the temporal integration processing unit 403. Additionally, if the first reference self-position is known, a self-position may be the amount of sequential change from a previous self-position.

The temporal integration processing unit 403 excludes a cell of a moving object from the environment map converted into the global map coordinate system, and adds and accumulate it on the global map stored in the buffer 404 on the basis of the information indicating the moving object converted into the global map coordinate system, and stores the global map in the buffer 404 and outputs it to the moving object arrangement unit 405.

The temporal integration processing unit 403 repeatedly performs the processing of adding and accumulating an environment map supplied in time series in the global map in consideration of a self-position, thereby integrating the environment maps. The method for integrating an environment map into a global map in the temporal integration processing unit 403 may employ the Bayes logic, the Dempster Shafer logic, the Kalman filter, and the like.

Figure 16:
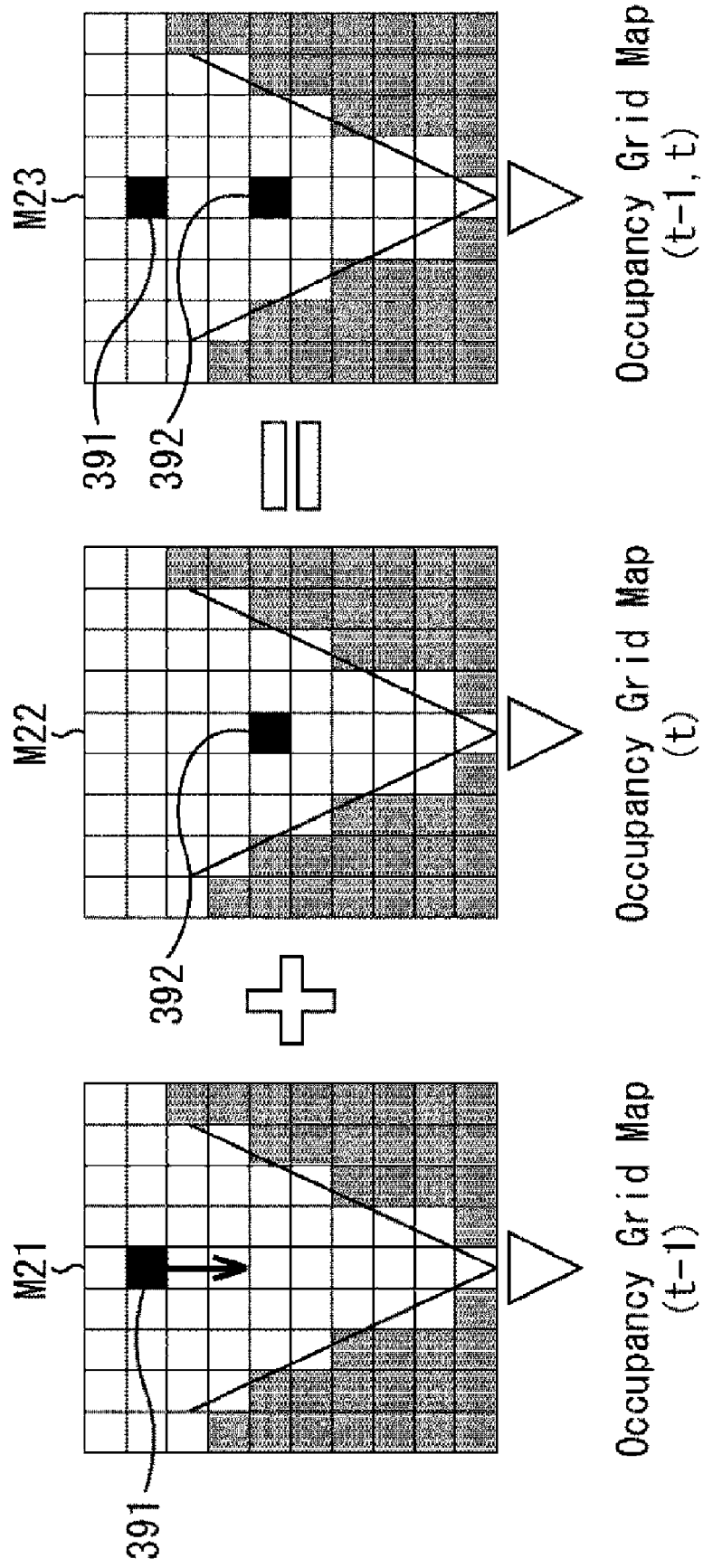
FIG. 16 is a diagram for explaining why to accumulate an environment map with a moving object excluded.

Further, it is assumed when adding and sequentially accumulating an environment map in a global map, the cell 391 including a moving object is included at time t-1 as illustrated in an environment map M21 on the left of FIG. 16, for example. Then, at a next time t, the subject corresponding to the cell 391 of the moving object is assumed to move to a cell 392 as illustrated in an environment map M22 in the middle of FIG. 16.

When the environment maps M21 and M22 are overlapped and accumulated as they are, both the cells 391 and 392 which are to express the same subject are accumulated and an inappropriate global map is generated as illustrated in an environment map M23 on the right of FIG. 16.

Thus, the temporal integration processing unit 403 excludes a moving object, and accumulates an environment map including only the motion-less cells except the moving object in the global map.

The moving object arrangement unit 405 adds an environment map at a current time to the global map supplied by the temporal integration processing unit 403 on the basis of the moving object label, and outputs the global map. With the processing, only the latest cell of the moving object is reflected on the global map.

Additionally, there has been described above the example in which an occupancy grid map as an environment map is accumulated in time series, but the maps with a label x may be similarly accumulated to be a global map.

Environment Map Generation Processing

Figure 17:
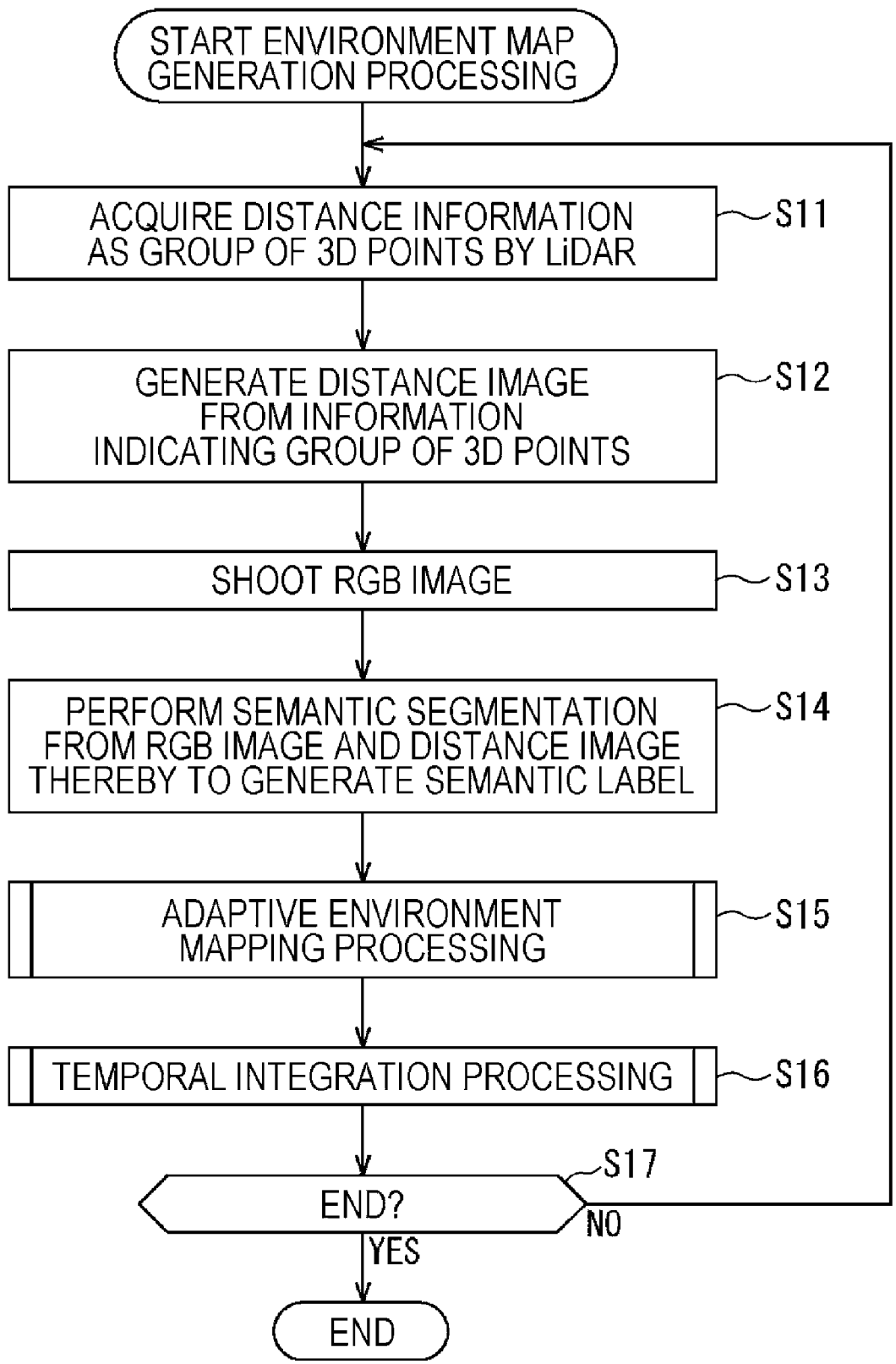
FIG. 17 is a flowchart for explaining an environment map generation processing.

An environment map generation processing will be described below with reference to a flowchart of FIG. 17.

In step S11, the LiDAR 301 horizontally projects a laser light in a respective radial light projection direction ahead in the moving direction while horizontally rotating the light projection unit arranged at a plurality of angles in the vertical direction, receives a light reflected on an obstacle, finds a distance on the basis of a round-trip time as a difference between the light projection time and the reflected light reception time, and outputs the distance as information indicating a group of 3D points to the camera image superimposition unit 311.

In step S12, the camera image superimposition unit 311 generates a distance image on the basis of the information indicating a group of 3D points in the method described in FIG. 6, and outputs the generated distance image to the adaptive environment mapping unit 321 and the semantic segmentation unit 312.

In step S13, the camera 302 shoots an RGB image ahead in the moving direction, and outputs it to the semantic segmentation unit 312.

In step S14, the semantic segmentation unit 312 gives a classification result of a subject as a semantic label in units of pixel by semantic segmentation on the basis of the RGB image and the distance image in the method described in FIG. 7, and outputs it to the adaptive environment mapping unit 321 and the temporal integration unit 322.

In step S15, the adaptive environment mapping unit 321 performs the adaptive environment mapping processing, generates an environment map at a current time on the basis of the distance image and the semantic labels, and outputs the generated environment map to the temporal integration unit 322. Additionally, the adaptive environment mapping processing will be described below with reference to a flowchart of FIG. 18.

In step S16, the temporal integration unit 322 performs the temporal integration processing, sequentially accumulates the environment maps on the basis of an environment map at a current time and a semantic label thereby to generate a global map, and outputs an environment map as a global map. Additionally, the temporal integration processing will be described below with reference to a flowchart of FIG. 19.

In step S17, a determination is made as to whether ending is instructed, and in a case where ending is not instructed, the processing returns to step S11 and its subsequent processing are repeatedly performed. Then in step S17, in a case where ending is instructed, the processing ends.

With the processing, the pixels for which distance information is not found by the LiDAR 301 among the pixels in the RGB image can be interpolated and generated on the basis of the distance information found by the LiDAR 301 from the information indicating a group of 3D points generated by the LiDAR 301 and the RGB image shot by the camera 302, thereby generating a distance image including the distance information of all the pixels.

Consequently, the high-definition distance information can be given, thereby generating a high-definition environment map.

Further, the environment maps in time series are sequentially accumulated thereby to generate a global map, and thus a self-position and its surrounding situation can be recognized in detail.

Adaptive Environment Mapping Processing

Figure 18:
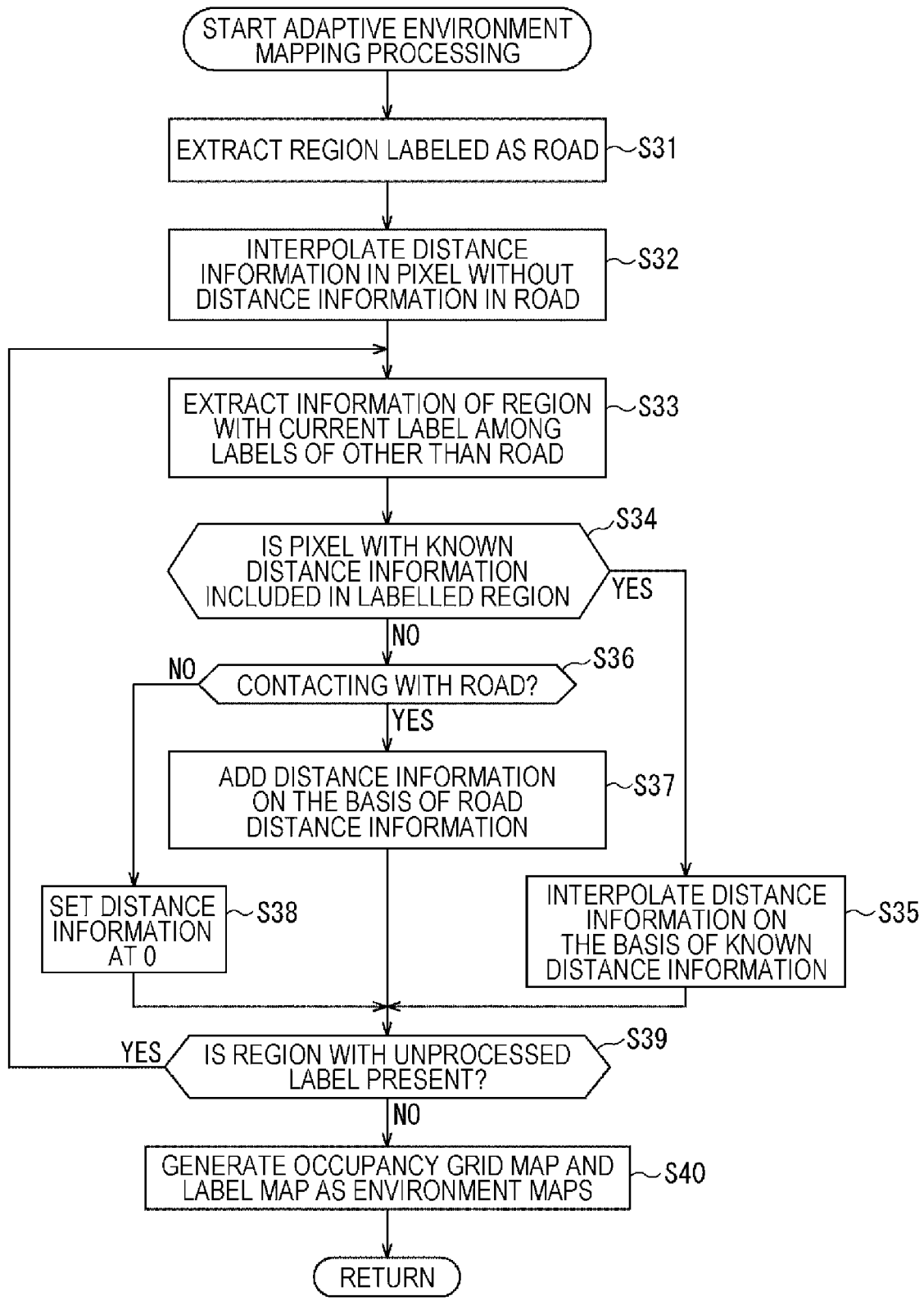
FIG. 18 is a flowchart for explaining an adaptive environment mapping processing.

The adaptive environment mapping processing will be described below with reference to the flowchart of FIG. 18.

In step S31, the adaptive environment mapping unit 321 extracts an RGB image and a distance image in a region labeled as road on the basis of the semantic label information.

In step S32, the adaptive environment mapping unit 321 interpolates and generates the pixels not given distance information among the pixels in the region labeled as road by use of the information of the pixels with distance information as described in FIG. 8 and FIG. 9.

In step S33, the adaptive environment mapping unit 321 sets an unprocessed label among the labels of other than road as a current label.

In step S34, the adaptive environment mapping unit 321 determines whether a pixel including effective distance information is present in the region with a current label. That is, as described in the middle of FIG. 10, in a case where the pixels with distance information as indicated in white dots are present in the frame W set for the pixel Ip indicated in a black dot for which distance information is to be found, or in a case where a pixel including distance information is present in the region with the same label as horizontal bar described in FIG. 11, a pixel including distance information is regarded as present, and the processing proceeds to step S35.

In step S35, the adaptive environment mapping unit 321 interpolates and generates distance information for each pixel without distance information in the region with a current label on the basis of the distance information of the near pixels including the distance information in the current label.

On the other hand, in step S34, in a case where it is regarded that a pixel including distance information is not present in the region with a current label, the processing in the adaptive environment mapping unit 321 proceeds to step S36. For example, in a case where a semantic label indicates sky or the like as described in FIG. 12, it may be regarded that a pixel including effective distance information is not present.

In step S36, the adaptive environment mapping unit 321 determines whether the part vertically below the region with a current label contacts with the road.

In step S36, for example, in a case where the part vertically below the region Z344 of the person 344 contacts with the region Z341 of the road 341 at the boundary Cp as illustrated in the lower right of FIG. 10, the part vertically below the region with a current label is regarded as contacting with the road, and the processing proceeds to step S37.

In step S37, the adaptive environment mapping unit 321 adds the distance information of the contacted road to the pixels in the region with a current label.

Further, in step S36, in a case where the part vertically below the region with a current label is regarded as not contacting with the road, the processing proceeds to step S38.

In step S38, the adaptive environment mapping unit 321 sets the pixels in the region with a current label at 0 indicating unknown distance information. That is, the adaptive environment mapping unit 321 sets the region with a label of sky or the like at 0 indicating unknown as described in FIG. 12.

In step S39, the adaptive environment mapping unit 321 determines whether an unprocessed label is present, and in a case where an unprocessed label is present, the processing returns to step S33. That is, the processing in steps S33 to S39 are repeatedly performed until no unprocessed label is present.

Then in step S39, in a case where the processing ends for all the labels and an unprocessed label is regarded as absent, the processing proceeds to step S40.

Figure 13:
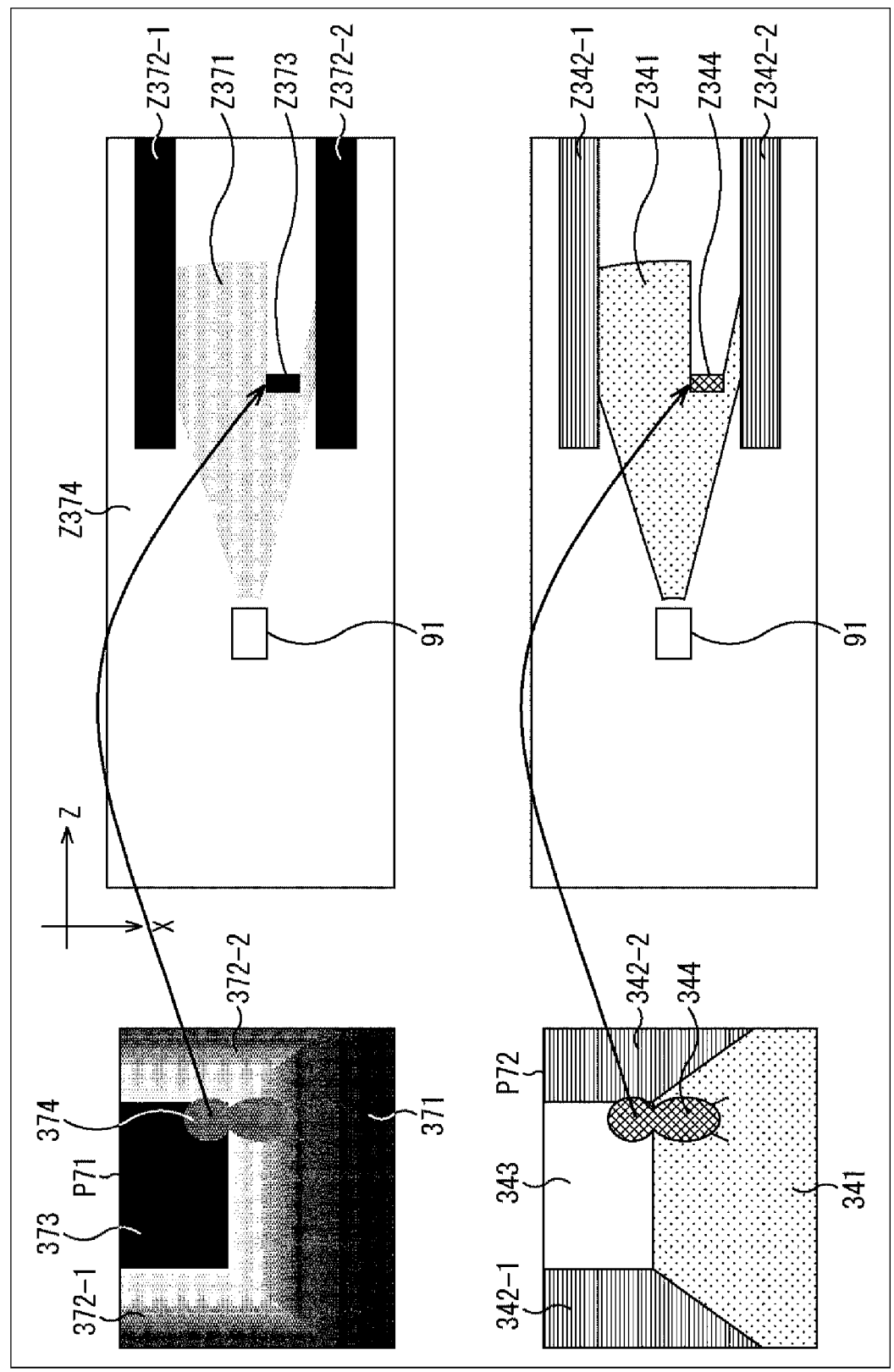
FIG. 13 is a diagram for explaining a method for generating an environment map and a label map.

In step S40, the adaptive environment mapping unit 321 generates an occupancy grid map and a label map as environment maps for all the pixels corresponding to the RGB image on the basis of the information of the distance image having distance information found and the semantic labels as described in FIG. 13, outputs them to the temporal integration unit 322, and terminates the processing.

That is, with the processing, it is possible to adaptively interpolate and generate the distance information of the pixels without distance information per region classified with the same label depending on the classified label. Consequently, a high-definition distance image can be generated, thereby generating a high-definition environment map.

Temporal Integration Processing

Figure 19:
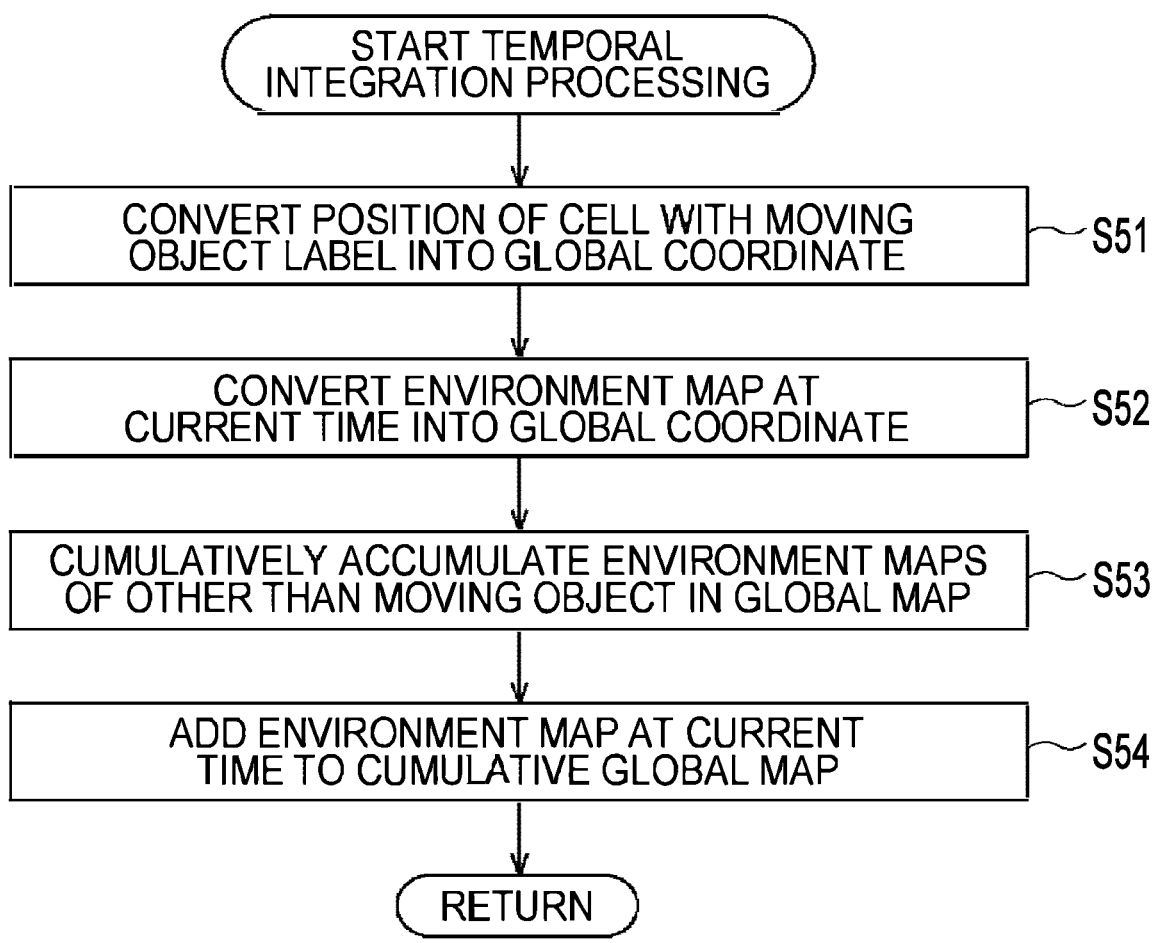
FIG. 19 is a flowchart for explaining a temporal integration processing.

The temporal integration processing will be described below with reference to the flowchart of FIG. 19.

In step S51, the global coordinate conversion unit 401 in the temporal integration unit 322 converts the coordinate in an environment map of a cell with a label regarded as moving object into the global coordinate on the basis of the semantic label information, and outputs it to the temporal integration processing unit 403 and the moving object arrangement unit 405.

In step S52, the global coordinate conversion unit 402 converts the coordinates in the environment map into the global coordinates, and outputs the global coordinates to the temporal integration processing unit 403.

In step S53, the temporal integration processing unit 403 excludes the cell of the moving object from the environment map converted into the coordinate system of the global map, adds it onto the global map stored in the buffer 404 on the basis of the information of the moving object converted into the coordinate system of the global map, accumulates and stores the same regions to be overlapped in the buffer 404 again, and outputs the global map to the moving object arrangement unit 405.

In step S54, the moving object arrangement unit 405 adds an environment map at a current time to the global map supplied from the temporal integration processing unit 403 on the basis of the moving object label, and outputs the global map. That is, only the cell indicating the moving object included in an environment map at a current time can be reflected on the global map.

With the above processing, the environment maps generated in time series can be accumulated, and a global map capable of easily recognizing a self-position or its surrounding situation can be generated and output as a final environment map.

As described above, the weakness of spatial resolution at which the LiDAR 301 is not good is compensated for by making use of spatial resolution and image recognition accuracy at which the camera 302 is good, and distance accuracy at which the camera 302 is not good is compensated for by the LiDAR 301, thereby generating a high-definition distance image and generating a high-definition environment map.

2. Example Performed in Software

However, the above processing can be performed in hardware, and can be performed in software. In a case where the processing are performed in software, a computer incorporated in dedicated hardware or various programs are installed so that programs configuring the software can be installed from a recording medium into a general-purpose computer capable of performing various functions, for example.

FIG. 20 illustrates an exemplary configuration of a general-purpose computer. The computer incorporates a central processing unit (CPU) 1001. The CPU 1001 is connected with an input/output interface 1005 via a bus 1004. The bus 1004 is connected with a read only memory (ROM) 1002 and a random access memory (RAM) 1003.

The input/output interface 1005 is connected with an input unit 1006 configured of an input device such as keyboard or mouse used by a user for inputting operation commands, an output unit 1007 for outputting a processing operation screen or a processing result image onto a display device, a storage unit 1008 configured of, for example, a hard disc drive for storing programs or various items of data, and a communication unit 1009 configured of a local area network (LAN) adaptor or the like for performing the communication processing via a network such as Internet. Further, it is connected with a drive 1010 for writing and reading into and from a removable medium 1011 such as magnetic disc (including flexible disc), optical disc (including compact disc-read only memory (CD-ROM) and digital versatile disc (DVD)), magnetooptical disc (including mini disc (MD)), or semiconductor memory.

The CPU 1001 performs various processing according to the programs stored in the ROM 1002, or the programs read from the removable medium 1011 such as magnetic disc, optical disc, magnetooptical disc or semiconductor memory, installed in the storage unit 1008, and loaded from the storage unit 1008 to the RAM 1003. The RAM 1003 stores the data or the like necessary for the CPU 1001 for performing various processing as necessary.

In the thus-configured computer, the CPU 1001 loads and executes the programs stored in the storage unit 1008 into the RAM 1003 via the input/output interface 1005 and the bus 1004, for example, so that the above processing are performed.

The programs executed by the computer (the CPU 1001) can be recorded and provided in the removable medium 1011 as package medium or the like, for example. Further, the programs can be provided via a wired or wireless transmission medium such as local area network, Internet, or digital satellite broadcasting.

In the computer, the removable medium 1011 is mounted on the drive 1010 so that the programs can be installed in the storage unit 1008 via the input/output interface 1005. Further, the programs can be received in the communication unit 1009 via a wired or wireless transmission medium, and installed in the storage unit 1008. Additionally, the programs can be preinstalled in the ROM 1002 or the storage unit 1008.

Additionally, the programs executed by the computer may be programs by which the processing are performed in time series in the order described in the present specification, or programs by which the processing are performed in parallel or at necessary timings such as on calling.

Additionally, the CPU 1001 in FIG. 20 realizes the functions of the automatic driving control unit 110 in FIG. 4. Further, the storage unit 1008 in FIG. 20 realizes the storage unit 109 in FIG. 4.

Further, in the present specification, a system indicates a set of a plurality of components (such as apparatuses and modules (parts)), and all the components are not necessarily present in the same casing. Thus, a plurality of apparatuses housed in separated casings and connected via a network, and one apparatus in which a plurality of modules are housed in one casing are also systems, respectively.

Additionally, an embodiment of the present disclosure is not limited to the above embodiment, and various modifications can be made without departing from the spirit of the present disclosure.

For example, the present disclosure can be configured as cloud computing in which one function is distributed and processed in cooperation in a plurality of apparatuses via a network.

Further, each step described in the flowcharts may be performed in one apparatus, or may be distributed and performed in a plurality of apparatuses.

Further, in a case where a plurality of processing is included in one step, the plurality of processing included in the step may be performed in one apparatus, or may be distributed and performed in a plurality of apparatuses.

Additionally, the present disclosure can take the following configurations.

(1)

A method comprising:

labeling each of a plurality of subjects in an image with a label, the label for each subject indicating a kind of the subject, wherein the labeling comprises analyzing the image and/or distance measurement points for an area depicted in the image; and determining additional distance information not included in the distance measurement points, wherein determining the additional distance information comprises interpolating and/or generating a distance to a point based at least in part on at least some of the distance measurement points, wherein the at least some of the distance measurement points are selected based at least in part on labels assigned to one or more of the plurality of subjects.

(2)

The method of (1), wherein interpolating and/or generating the distance to the point based at least in part on at least some of the distance measurement points comprises, in response to determining that one or more of the distance measurement points are associated with a same subject, of the plurality of subjects, as the point and are within a range of the point, interpolating the distance to the point based on the one or more points of the distance measurement points.

(3)

The method of (2), wherein interpolating and/or generating the distance to the point based at least in part on at least some of the distance measurement points further comprises, in response to determining that there are not one or more distance measurement points that are associated with the same subject as the point and are within the range of the point, identifying a boundary between the subject with which the point is associated and another subject, of the plurality of subjects, that is adjacent to the subject in the image, and further comprises generating the distance to the point based at least in part on distance information calculated for the other subject.

(4)

The method of (3), wherein generating the distance to the point based at least in part on distance information calculated for the other subject comprises generating the distance to the point based on distance information indicating a distance to a part of the other subject adjacent to the boundary.

(5)

The method of (3), wherein identifying a boundary between the subject with which the point is associated and another subject comprises identifying a boundary that is positioned in the image vertically below the point.

(6)

The method of any one or more of (1) to (5), wherein the at least some distance measurement points are distance measurements points associated with a same subject, of the plurality of subjects, as the point.

(7)

The method of any one or more of (1) to (5), wherein the at least some distance measurement points are distance measurement points associated with another subject, of the plurality of subjects, that is adjacent in the image to the subject with which the point is associated.

(8)

The method of any one or more of (1) to (7), further comprising navigating a vehicle based at least in part on the distance measurement points and/or the additional distance information.

(9)

The method of any one or more of (1) to (8), wherein the distance measurement points are discretely-arranged distance measurement points.

(10)

The method of any one or more of (1) to (9), wherein the distance measurement points each indicate a LiDAR measurement of a distance to a point depicted in the image.

(11)

The method of any one or more of (1) to (10), further comprising measuring distances to a plurality of points in the area depicted in the image to yield the distance measurement points.

(12) The method of (11), further comprising capturing the image. (13)

The method of any one or more of (1) to (12), wherein analyzing the image and/or the distance measurement points comprises analyzing the image and/or the distance measurement points using a trained classifier that is trained to a plurality of kinds of subject, and wherein labeling each of the plurality of subjects comprises labeling each of the plurality of subjects according to an output from the trained classifier.

(14)

A method comprising labeling each of a plurality of subjects in an image with a label, the label for each subject indicating a kind of the subject, wherein the labeling comprises analyzing the image and/or distance measurement points for an area depicted in the image, and determining additional distance information not included in the distance measurement points, wherein determining the additional distance information comprises calculating a distance to a point based at least in part on at least some of the distance measurement points and on labels assigned to one or more of the plurality of subjects.

(15)

The method of (14), wherein calculating the distance to the point based at least in part on at least some of the distance measurement points and on labels assigned to the one or more of the plurality of subjects comprises, in response to determining that one or more points, of the distance measurement points, are associated with a same subject, of the plurality of subjects, as the point and are within a range of the point, interpolating the distance to the point based on the one or more points.

(16)

The method of (14), wherein calculating the distance to the point based at least in part on at least some of the distance measurement points and on labels assigned to the one or more of the plurality of subjects further comprises, in response to determining that there are not one or more points, of the distance measurement points, that are associated with the same subject as the point and are within the range of the point, identifying a boundary between the subject with which the point is associated and another subject, of the plurality of subjects, that is adjacent to the subject in the image, and generating the distance to the point based at least in part on distance information calculated for the other subject.

(17)

An apparatus comprising at least one processor and at least one storage medium having encoded thereon executable instructions that, when executed by at least one processor, cause the at least one processor to carry out the method of any one or more of (1) to (16).

(18)

A mobile system comprising a vehicle and the apparatus of (17), wherein the method further comprises navigating the vehicle based at least in part on the distance measurement points and/or the additional distance information.

(19)

The system of (18), further comprising a LiDAR, wherein the distance measurement points are LiDAR measurements to a plurality of points in the area depicted in the image and wherein the method further comprises measuring, using the LiDAR, distances to the plurality of points in the area depicted in the image.

(20)

The system of any one or more of (18) and (19), further comprising a camera, wherein the method further comprises operating the camera to capture the image.

(21)

At least one non-transitory storage medium having encoded thereon executable instructions that, when executed by at least one processor, cause the at least one processor to carry out the method of any one or more of (1) to (16).

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

91 Mobile object
100 Mobile object control system
102 Data acquisition unit
110 Automatic driving control unit
141 Mobile object external information detection unit
152 Situation recognition unit
301 LiDAR
302 Camera
311 Camera image superimposition unit
312 Semantic segmentation unit
321 Adaptive environment mapping unit
322 Temporal integration unit
401, 402 Global coordinate conversion unit
403 Temporal integration unit
404 Buffer
405 Moving object arrangement unit

The invention claimed is:

1. A method performed by an electronic device installed in a vehicle, the method comprising:
generating a sequence of global maps; and
displaying the sequence of global maps,
wherein the generating the sequence of global maps comprises:
acquiring distance information for a group of three dimensional (3D) points corresponding to a scene in a moving direction of the vehicle, the group of 3D points obtained by a laser imaging detection and ranging (LiDAR) projection that is projected in the moving direction of the vehicle;
generating one or more distance images based on the distance information;
acquiring one or more red-green-blue (RGB) images of the scene in the moving direction to obtain pixels corresponding each of the one or more distance images;
based on the one or more RGB images and the one or more distance images, classifying individual subjects in the scene with a corresponding semantic label in units of pixel,
wherein the individual subjects are classified via machine learning;
based on the one or more distance images and the semantic labels of the individual subjects in the scene, performing an adaptive environment mapping process to generate a plurality of environment maps in a time series; and
performing a temporal integration process on the plurality of environment maps in the time series to generate the sequence of global maps,
wherein, for each of the plurality of environment maps, the adaptive environment mapping process comprises:
extracting a first RGB image from the one or more RGB images and a first distance image of the one or more distance images, the first RGB image and the first distance image in a first region corresponding to a first semantic label;
based on the first distance image, interpolating pixels of the first RGB image to generate distance information of a pixel of the first RGB image that do not match to distance information of the first distance image;
for each semantic label different from the first semantic label, performing a label-specific process that includes:
extracting information about a label-specific region; and
for each pixel of the label-specific region:
determining whether a pixel of the label-specific region includes distance information indicating that the pixel of the label-specific region is within a predetermined distance of the first RGB image;
based on the pixel of the label-specific region including distance information indicating that the pixel of the label-specific region is within the predetermined distance of the first RGB image, interpolating between another pixel of the label-specific region without distance information and within a predetermined distance of the pixel of the label-specific region with the distance information to generate distance information for the pixel of the label-specific region without the distance information;
based on the pixel of the label-specific region not including distance information that indicates that the pixel of the label-specific region is within the predetermined distance of the first RGB image, determining whether a lower part of the label-specific region contacts the first region;
based on the lower part of the label-specific region contacting the first region, adding distance information to the pixel of the label-specific region that is based on distance information of a pixel of the first RGB image; and
based on the lower part of the label-specific region not contacting the first region, setting the distance information of the pixel of the label-specific region to zero; and
upon completing the label-specific process for all semantic labels different from the first semantic label, generating a corresponding one of the plurality of environment maps in the time series based on processed pixels corresponding to the first semantic label and all semantic labels different from the first semantic label,
wherein each of the plurality of environment maps in the time series includes an occupancy map and a label map for pixels corresponding to the RGB image.

2. The method of claim 1, wherein the temporal integration process comprises:
for each of the plurality of environment maps in the time series, performing parallel operations of:
for any individual subject in the scene having a corresponding semantic label regarded as a moving object, converting corresponding coordinates in the environment map, relative to a self-position of the vehicle, into a first set of global coordinates; and
converting all coordinates of the environment map, relative to the self-position of the vehicle, into a second set of global coordinates;
performing a time-series process on the first and second set of global coordinates to produce the sequence of global maps,
wherein the sequence of global maps includes features related to displaying:
movements of the vehicle with respect to any individual subject in the scene not having a corresponding semantic label regarded as a moving object, and movements of the any individual subject in the scene having the corresponding semantic label regarded as the moving object with respect to:

the movements of the vehicle, and the any individual subject in the scene not having the corresponding semantic label regarded as the moving object.

3. An apparatus configured to be installed in a vehicle and comprising:

at least one processor; and at least one storage medium having encoded thereon executable instructions that, when executed by at least one processor, cause the at least one processor to carry out a method comprising:

generating a sequence of global maps; and displaying the sequence of global maps, wherein the generating the sequence of global maps comprises:

acquiring distance information for a group of three dimensional (3D) points corresponding to a scene in a moving direction of the vehicle, the group of 3D points obtained by a laser imaging detection and ranging (LiDAR) projection that is projected in the moving direction of the vehicle;

generating one or more distance images based on the distance information;

acquiring one or more red-green-blue (RGB) images of the scene in the moving direction to obtain pixels corresponding each of the one or more distance images;

based on the one or more RGB images and the one or more distance images, classifying individual subjects in the scene with a corresponding semantic label in units of pixel, wherein the individual subjects are classified via machine learning;

based on the one or more distance images and the semantic labels of the individual subjects in the scene, performing an adaptive environment mapping process to generate a plurality of environment maps in a time series; and performing a temporal integration process on the plurality of environment maps in the time series to generate the sequence of global maps, wherein, for each of the plurality of environment maps, the adaptive environment mapping process comprises:

extracting a first RGB image from the one or more RGB images and a first distance image of the one or more distance images, the first RGB image and the first distance image in a first region corresponding to a first semantic label;

based on the first distance image, interpolating pixels of the first RGB image to generate distance information of a pixel of the first RGB image that do not match to distance information of the first distance image;

for each semantic label different from the first semantic label, performing a label-specific process that includes:

extracting information about a label-specific region; and for each pixel of the label-specific region:

determining whether a pixel of the label-specific region includes distance information indicating that the pixel of the label-specific region is within a predetermined distance of the first RGB image;

based on the pixel of the label-specific region including distance information indicating that the pixel of the label-specific region is within the predetermined distance of the first RGB image, interpolating between another pixel of the label-specific region without distance information and within a predetermined distance of the pixel of the label-specific region with the distance information to generate distance information for the pixel of the label-specific region without the distance information;

based on the pixel of the label-specific region not including distance information that indicates that the pixel of the label-specific region is within the predetermined distance of the first RGB image, determining whether a lower part of the label-specific region contacts the first region;

based on the lower part of the label-specific region contacting the first region, adding distance information to the pixel of the label-specific region that is based on distance information of a pixel of the first RGB image; and based on the lower part of the label-specific region not contacting the first region, setting the distance information of the pixel of the label-specific region to zero; and upon completing the label-specific process for all semantic labels different from the first semantic label, generating a corresponding one of the plurality of environment maps in the time series based on processed pixels corresponding to the first semantic label and all semantic labels different from the first semantic label, wherein each of the plurality of environment maps in the time series includes an occupancy map and a label map for pixels corresponding to the RGB image.

4. A mobile system comprising:

a vehicle; and the apparatus of claim 3.

5. The system of claim 4, further comprising:

a LiDAR configured to obtain the group of 3D points.

6. The system of claim 4, further comprising:

a camera configured to acquire the one or more red-green-blue (RGB) images.

7. The apparatus of claim 3, wherein the temporal integration process comprises:

for each of the plurality of environment maps in the time series, performing parallel operations of:

for any individual subject in the scene having a corresponding semantic label regarded as a moving object, converting corresponding coordinates in the environment map, relative to a self-position of the vehicle, into a first set of global coordinates; and converting all coordinates of the environment map, relative to the self-position of the vehicle, into a second set of global coordinates;

performing a time-series process on the first and second set of global coordinates to produce the sequence of global maps, wherein the sequence of global maps includes features related to displaying:

movements of the vehicle with respect to any individual subject in the scene not having a corresponding semantic label regarded as a moving object, and movements of the any individual subject in the scene having the corresponding semantic label regarded as the moving object with respect to:

the movements of the vehicle, and the any individual subject in the scene not having the corresponding semantic label regarded as the moving object.

8. At least one non-transitory storage medium having encoded thereon executable instructions that, when executed by at least one processor, cause the at least one processor to carry out the method of claim 1.

* * * * *